United States Patent [19]

Harris et al.

[11] Patent Number: 5,196,775

[45] Date of Patent: Mar. 23, 1993

[54] SWITCHED RELUCTANCE MOTOR POSITION BY RESONANT SIGNAL INJECTION

[75] Inventors: William A. Harris, Coon Rapids; Jay R. Goetz, Minnetonka; Kevin J. Stalsberg, White Bear Lake, all of Minn.

[73] Assignee: Honeywell Inc., Minneapolis, Minn.

[21] Appl. No.: 658,482

[22] Filed: Feb. 20, 1991

[51] Int. Cl.$^5$ .............................................. G05B 1/06
[52] U.S. Cl. ..................... 318/638; 318/799; 318/607; 363/98
[58] Field of Search ............... 318/701, 138, 696, 638, 318/607, 799, 801, 796, 797, 815; 363/17, 98, 90, 91, 79, 165; 323/224, 232, 249

[56] References Cited

U.S. PATENT DOCUMENTS

| | | | |
|---|---|---|---|
| 3,611,138 | 10/1971 | Winebrener | 318/801 |
| 3,790,877 | 2/1974 | Bailey | 363/71 |
| 3,982,167 | 9/1976 | Espelage | 363/165 |
| 4,520,302 | 5/1985 | Hill et al. . | |
| 4,532,582 | 7/1985 | Freeny, Jr. | 323/249 |
| 4,609,859 | 9/1986 | Williams | 318/701 |
| 4,611,157 | 9/1986 | Miller et al. . | |
| 4,642,543 | 2/1987 | MacMinn . | |
| 4,661,897 | 4/1987 | Pitel | 363/98 |
| 4,731,570 | 3/1988 | Lee | 318/701 |
| 4,748,393 | 5/1988 | Fincher et al. | 318/638 |
| 4,772,839 | 9/1988 | MacMinn et al. . | |
| 4,777,419 | 10/1988 | Obradovic . | |
| 4,868,478 | 9/1989 | Hedlund et al. . | |
| 4,876,491 | 10/1989 | Squires et al. . | |
| 4,933,620 | 6/1990 | MacMinn et al. | 318/701 |
| 4,942,345 | 7/1990 | Horst . | |
| 4,943,760 | 7/1990 | Byrne et al. . | |
| 5,015,939 | 5/1991 | Konecny | 318/701 |
| 5,070,264 | 12/1991 | Conrad . | |
| 5,075,836 | 12/1991 | Suzuki et al. | 363/17 |

Primary Examiner—William M. Shoop, Jr.
Assistant Examiner—John W. Cabeca
Attorney, Agent, or Firm—Michael B. Atlass; John B. Conklin

[57] ABSTRACT

A apparatus is provided for estimating the position of a rotor of a commutated brushless motor operating without a shaft position sensor. The apparatus includes a tank circuit that incorporates a phase winding of the motor. A low-power signal of a frequency $F_1$ is injected into the tank circuit. The frequency $F_1$ is much greater than the switching frequency $F_s$ of the phase winding. Because the effective inductance (L) of the phase winding incorporated into the tank circuit changes in a cyclic manner in response to changes in the mechanical angle $\Theta$ of the rotor, the characteristic resonant frequency $F_0$ of the tank circuit varies between maximum and minimum values. The effect of the variation of the resonant frequency $F_0$ on the output characteristics of the tank circuit are used by a detection circuit to resolve the mechanical angle $\Theta$ of the rotor and, thereby, control the timing of the phase firing sequence. The two illustrated embodiments detect changes to the amplitude and phase, respectively, of the signal from the tank circuit in response to the changing inductance of the phase winding incorporated into the tank circuit.

27 Claims, 15 Drawing Sheets

DATA

SWITCHED RELUCTANCE MOTOR POSITION BY RESONANT SIGNAL INJECTION

TECHNICAL FIELD

This invention relates in general to an apparatus and method for estimating the position of a rotor of a commutated motor operating without a shaft position sensor and, specifically, to estimating rotor position from the inductance characteristics of unenergized phases of the motor.

BACKGROUND

Because of recent developments in power semiconductor devices such as power MOSFETs and insulated gate thyristors (IGTs), electronically commutated motors such as variable reluctance (VR) and brushless permanent magnet (PM) motors have gained attention relative to other types of motors suitable for variable-speed drive applications. This increased attention derives from the fact that electronically commutated motors compare very favorably with other types of motors typically used as variable-speed drives. For example, their speed versus average torque curves are fairly linear with no discontinuities. They are rugged and robust and therefore well suited for heavy duty use. They have excellent heat dissipation qualities, and they do not require brushes or slip rings. Moreover, using state-of-the-art semiconductor technology for controllers, the efficiency of brushless commutated motors compares very favorably with other classes of variable-speed motors such as invertor-driven AC motors. Additionally, VR motors are the lowest cost type of motor to manufacture. Their drive circuits are the simplest and lowest cost compared to drives for other variable-speed motors.

As variable-speed drives, VR motors are designed for efficient power conversion rather than for particular torque or control characteristics typically required in stepper motor applications, and the pole geometry and control strategies differ accordingly. For example, the number of rotor teeth is relatively small in an electronically commutated reluctance motor (e.g., variable reluctance stepper motors), giving a large step angle, and the conduction angle is, generally, modulated as a function of both speed and torque to optimize operation as a variable-speed drive. In continuously rotating, variable speed applications, VR motors are often called switched reluctance or SR motors to distinguish them as a class from VR motors operated as stepper motors. Hereinafter, continuous drive VR motors are simply called SR motors.

Electronically commutated motors conventionally have multiple poles on both the stator and rotor—i.e., they are doubly salient. For the SR motor, there are phase windings on the stator but no windings or magnets on the rotor. For PM motors, however, permanent magnets are mounted on the rotor. In a conventional configuration of either type of motor, each pair of diametrically opposite stator poles carry series connected windings that form an independent phase of a power signal.

Torque is produced by switching current into each winding of a phase in a predetermined sequence that is synchronized with the angular position of the rotor, so that the associated stator pole is polarized and the resulting magnetic force attracts the nearest rotor pole. The current is switched off in each phase before the poles of the rotor nearest the stator poles of that phase rotate past the aligned position; otherwise, the magnetic force of the attraction would produce a negative or breaking torque. For SR motors, the torque developed is independent of the direction of current flow in the phase windings so that unidirectional current pulses synchronized with rotor movement can be applied to the stator phase windings by a convertor using unidirectional current switching elements such as thyristors or transistors.

The converters for electronically commutated motors operate by switching the stator phase current on and off in synchronism with rotor position. By properly positioning the firing pulses relative to the angle of the rotor, forward or reverse operation and motoring or generating operation can be obtained.

Usually, the desired commutation of a phase current is achieved by feeding back a rotor position signal to a controller from a shaft position sensor—e.g., an encoder or resolver. For cost reasons in small drives and reliability reasons in larger drives and to reduce, weight and inertia in all such drives, it is desirable to eliminate this shaft position sensor.

To this end, various approaches have previously been proposed for indirect sensing of the rotor position by monitoring terminal voltages and currents of the motor. One such approach, referred to as waveform detection, depends upon the back electromotive forces (emf) and is, therefore, unreliable at low speeds. Another approach is described in U.S. Pat. Nos. 4,611,157 and 4,642,543 assigned to General Electric Company of Schenectady, N.Y. In these patents, the average d.c. link current is used to dynamically stabilize a drive for a SR motor. Such systems are believed to be limited by the average nature of their feedback information and by the tendency of the SR motor to jitter at start-up.

In U.S. Pat. No. 4,772,839 assigned to General Electric Company of Schenectady, N.Y., a sampling pulse is injected into each of the unenergized phases of a SR motor. Rotor position is estimated by firing an unenergized phase for a time period short enough that the build-up of current and the motion of the rotor are negligible. The slope of the initial current rise in the unenergized phase is used to determine inductance. By sampling more than one phase, the direction of the rotor rotation is determined. Specifically, the sampling in each phase provides two possible angles for the rotor. Two angles are possible because the rotor can be turning in either clockwise or counterclockwise directions. By sampling in two phases and comparing the rotor angles derived from the sampling of the two phases, the correct or actual rotor angle is identified since only one of the two angles identified by each phase will be equal to one of the two angles in the other phase. This common angle is identified as the actual position of the rotor with respect to its direction of rotation. The estimated rotor angles are derived from absolute values of the inductance. Therefore, the control system must be precisely matched with a particular motor.

In U.S. Pat. No. 4,520,302, assigned to National Research Development Corporation, a control circuit for SR motors is disclosed that utilizes the fact that the inductance of a phase winding is dependent on rotor position and varies substantially sinusoidally from a maximum to a minimum as the rotor advances over a pole pitch. The control circuit utilizes the variation of inductance to measure certain characteristics of current flow in an appropriate one of the windings in order to derive an indication of rotor position and thus provide closed-loop control of the motor. Like the control system of the foregoing '839 patent, the absolute value of the inductance of the winding must be determined in order to derive a rotor position.

SUMMARY OF THE INVENTION

It is the primary object of the invention to provide a closed-loop control for an electronically commutated motor that detects the instantaneous position of the rotor without the use of a dedicated electromechanical or other sensor in a manner that is substantially independent of the specific electromagnetic characteristics of the motor. No sensor attached to the motor itself is required. All sensing is done through existing power leads.

It is a related object of the invention to provide a closed-loop control system for an electronically commutated motor that can be used with many different types of electronically commutated motors of the same class, but having a range of electromagnetic characteristics.

It is also an object of the invention to provide a control system for electronically commutated motors having the foregoing characteristics and additionally having good noise immunity properties.

It is also an object of the invention to provide a circuit for remotely detecting the position of the rotor of a electronically commutated motor without requiring the analysis of a power signal delivered to a phase winding. In this connection, it is a related object of the invention to remotely detect the position of the rotor without involving operation of the power circuit of the control system for the motor.

The foregoing and other objects are realized by a detection circuit that includes a resonant tank circuit whose inductive (L) element is one of the phase windings of the motor. A generator injects a low-energy signal of a frequency $F_1$ into an input of the tank circuit and the electrical characteristics of the output signal are sensed and processed in order to determine the mechanical angle $\Theta$ of the rotor.

As the rotor rotates, the effective inductance of a phase winding varies over time between minimum and maximum values. Because the resistive (R) and capacitive (C) elements of the tank circuit are fixed values, the resonant frequency $F_0$ of the tank circuit changes in time in a manner that is proportional to $$1/\sqrt{L(t)},$$

where $L(t)$ is the variable inductance of the phase winding incorporated into the tank circuit. When the difference between the frequency $F_1$ of the injected signal and the resonant frequency $F_0$ are at a minimum, the amplitude of the output of the tank circuit is at a maximum and the phase angle between the injected signal and the output of the tank circuit is at a minimum. In the first illustrated embodiment, the value of the resistive (R) element is selected to provide a relative high quality factor (Q) for the tank circuit so that the maximum amplitude can be detected. In the second embodiment, the value of the resistive (R) element is selected to provide a relatively lower Q for the tank circuit so that the minimum phase angle can be more easily detected.

In the illustrated embodiments, each phase winding incorporates a pair of stator windings in a conventional configuration, wherein each phase energizes diametrically opposite stator poles. It will be appreciated, however, that the invention can be applied to virtually all types of configurations of brushless commutated motors. In this regard, the tank circuit may incorporate an entire phase winding as illustrated or a portion of the phase winding such as one or more of the individual stator coils comprising the phase winding.

Other objects and advantages will become apparent upon reference to the following detailed description when taken in conjunction with the drawings.

Figure 14:
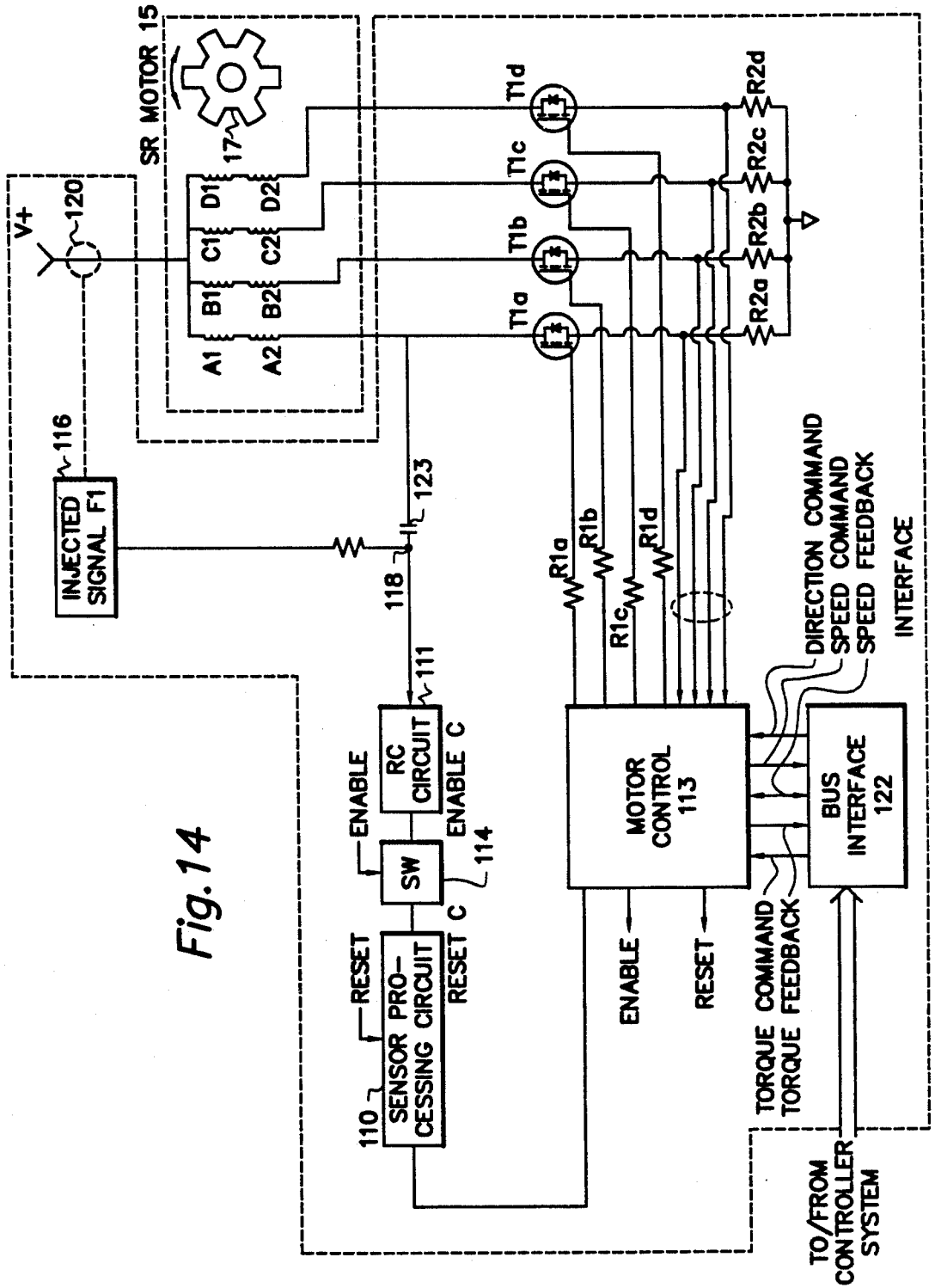
Figure 15:
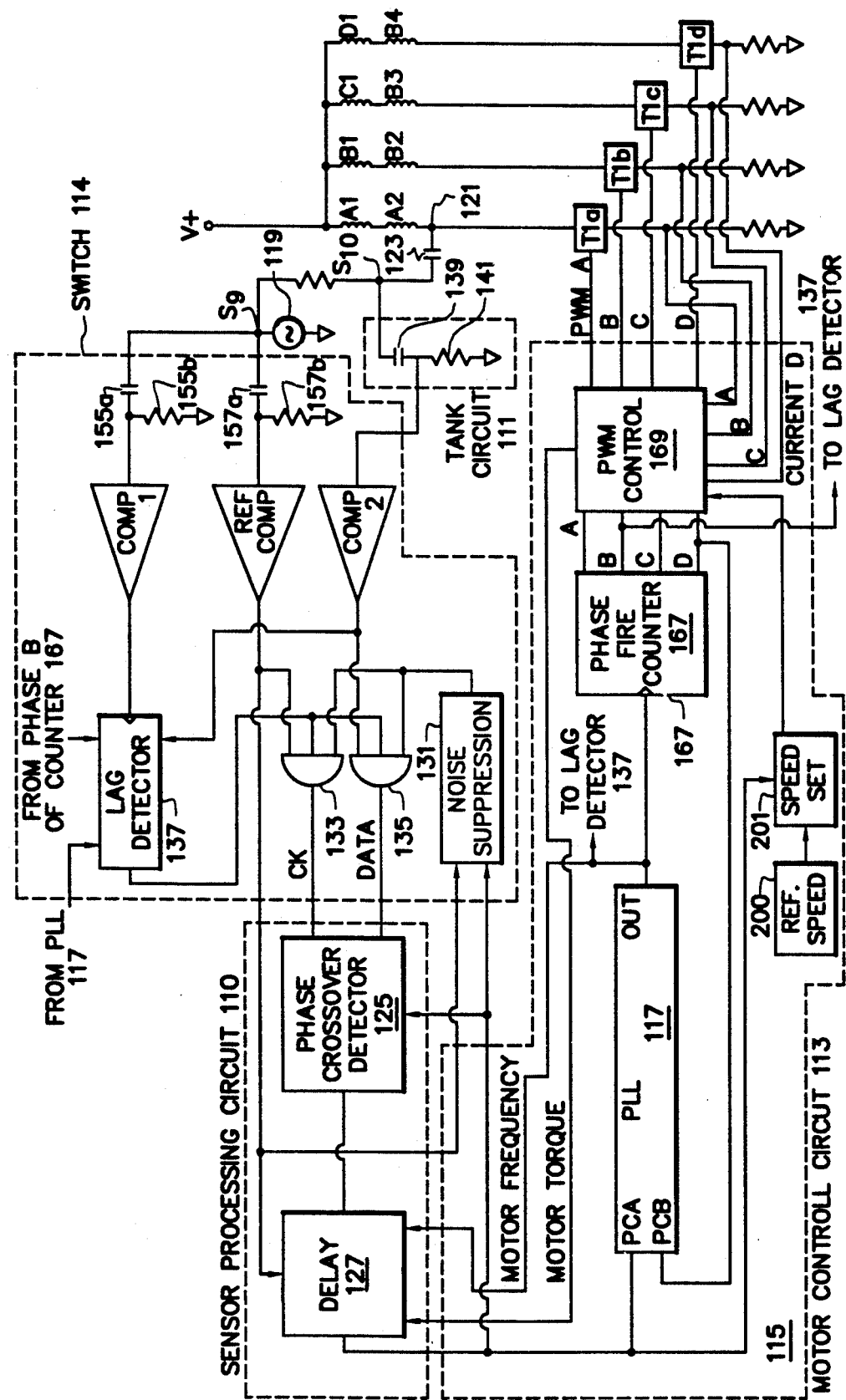
Figure 16:
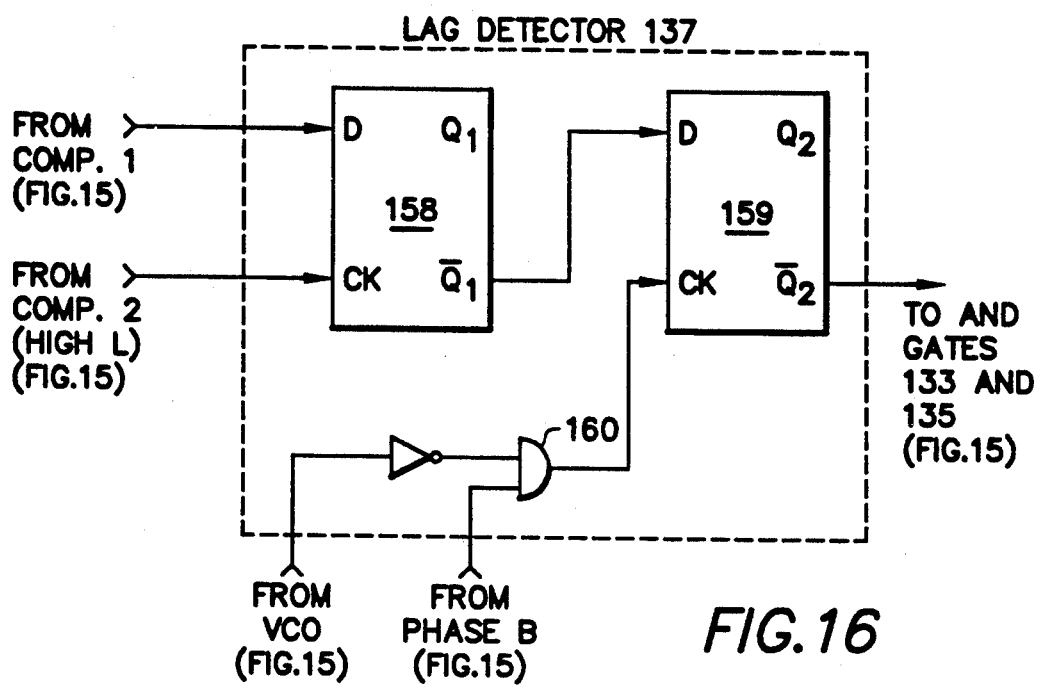
Figure 17:
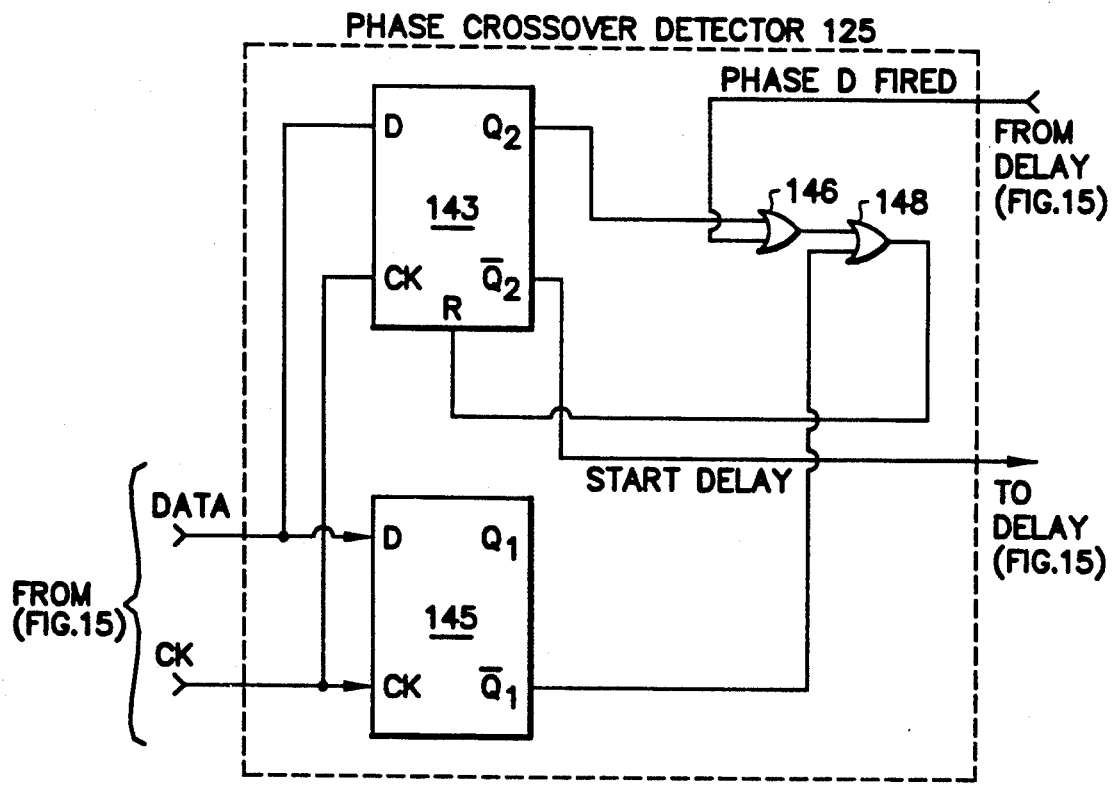
Figure 18:
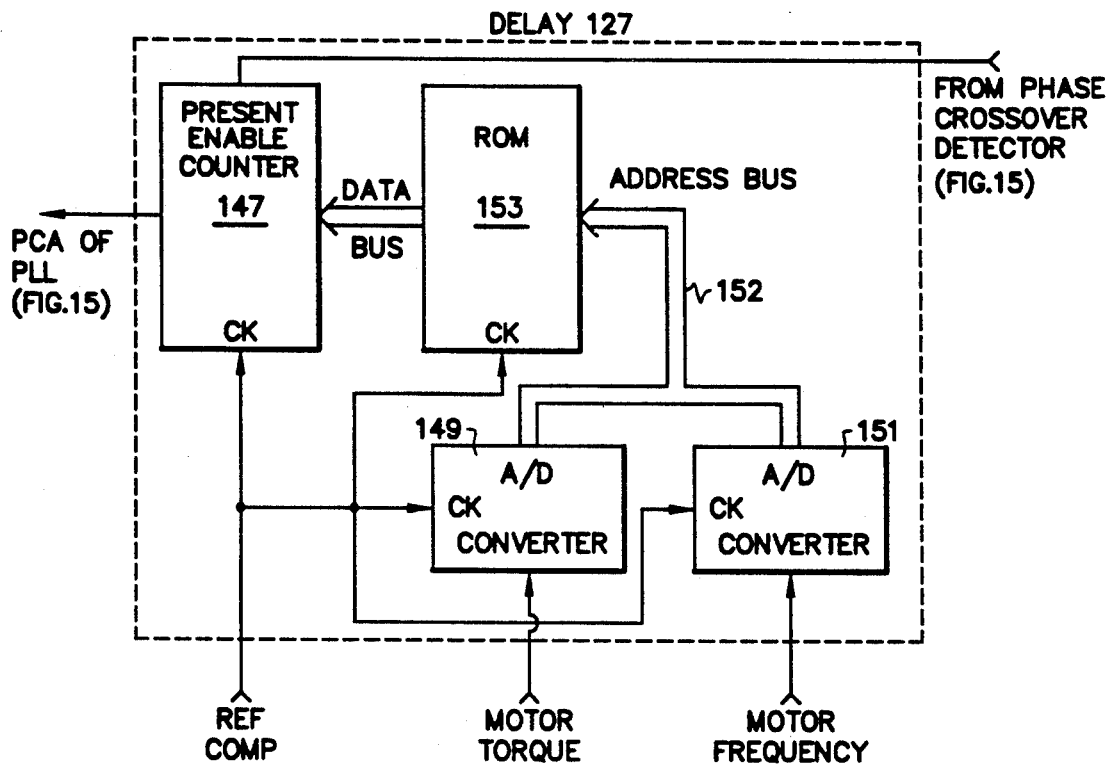
Figure 19:
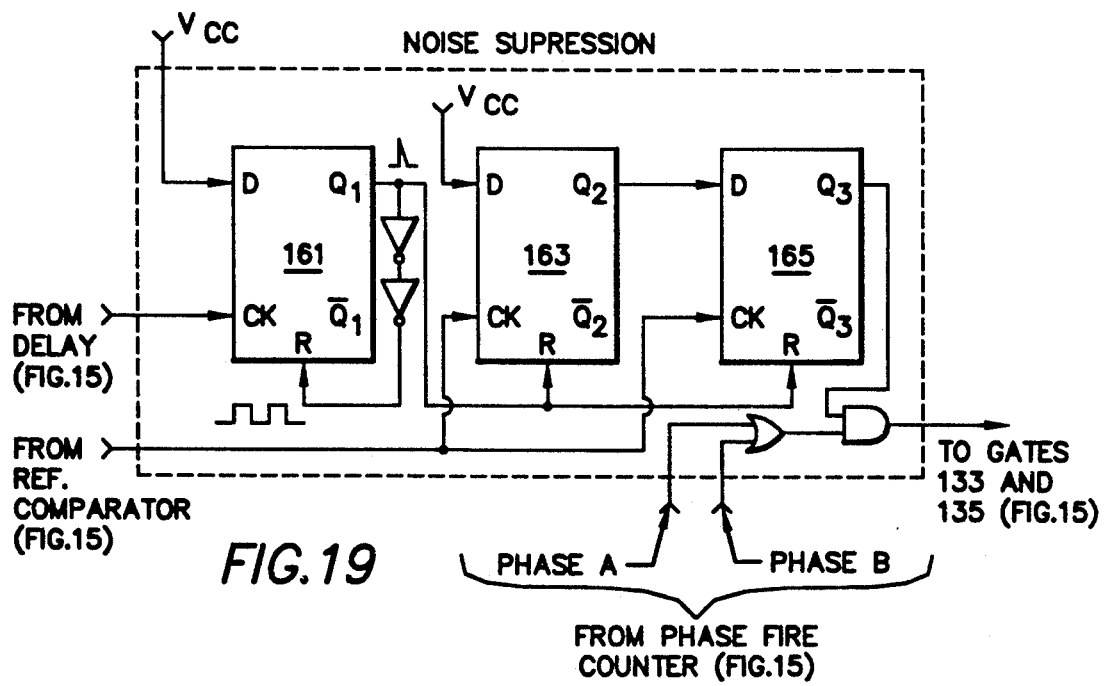
Figure 20A:
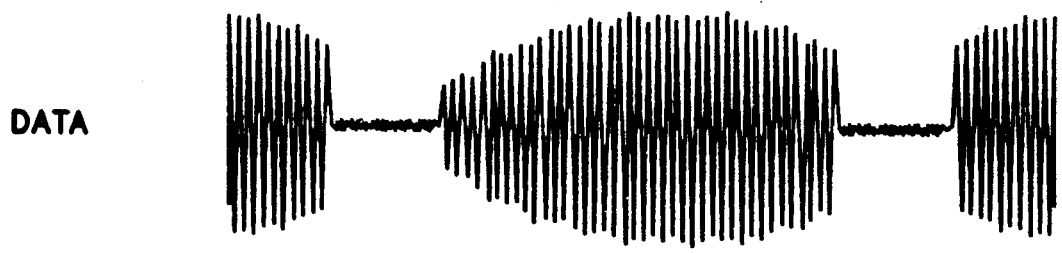
Figure 20B:
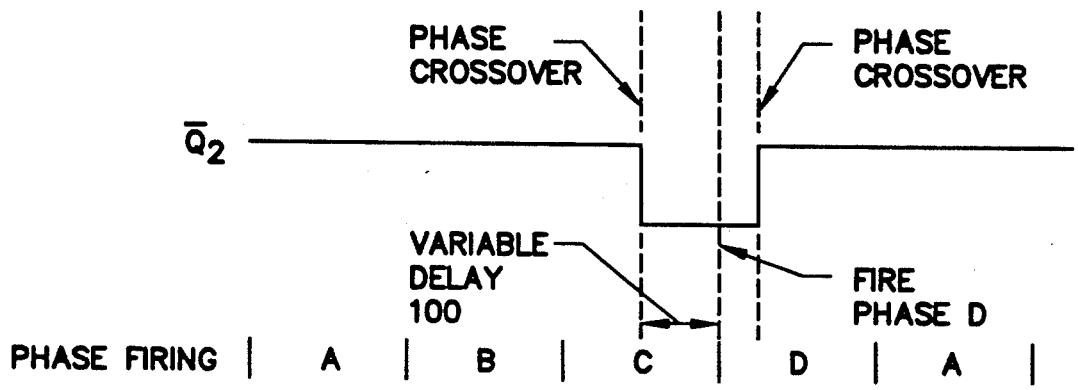
Figure 21:
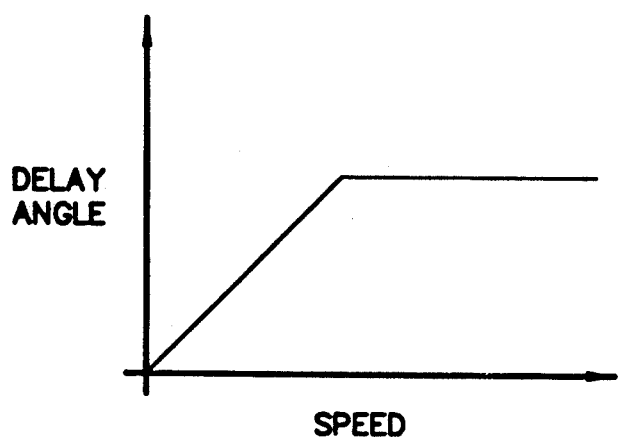

the phase shift of the injected signal and (c) the firing of the phase windings A-D;

FIG. 14 is a block diagram of a circuit in accordance with a second embodiment of the invention for controlling a brushless commutated motor, wherein the relative position of the rotor is determined by a phase crossover detector that responds to a low level signal injected into a tank circuit incorporating the windings of a single phase of the motor;

FIG. 15 is a detailed block diagram of the detection circuit employed in the circuit of FIG. 14 for detecting phase crossover;

FIG. 16 is a detailed circuit diagram of a lag detector incorporated into the circuit of FIG. 15;

FIG. 17 is a detailed circuit diagram of a phase crossover detector incorporated into the circuit of FIG. 15;

FIG. 18 is a detailed circuit diagram of a delay circuit incorporated into the circuit of FIG. 15;

FIG. 19 is a detailed circuit diagram of a noise suppression circuit incorporated into the circuit of FIG. 15;

FIGS. 20a-20b are exemplary diagrams of the output signals from the tank circuit and the phase crossover circuit of the circuit of FIG. 15; and FIG. 21 is an idealized and exemplary graph of the delay function employed by the delay circuit in order to insert a time delay between the detection signals provided by the detection circuit and the signals used to fire the phases of the motor.

While the control system of the invention will be described in connection with first and second embodiments, there is no intent to limit the invention to such embodiments. On the contrary, the intent is to cover all alternatives, modifications and equivalents included within the spirit and scope of the invention as defined by the appended claims. Furthermore, although the control system and detection circuit of the invention are described in connection with a SR motor, those skilled in the art of motor controls will appreciate that it can be applied to any electronically commutated motor.

DETAILED DESCRIPTION OF THE EMBODIMENT

Figure 1:
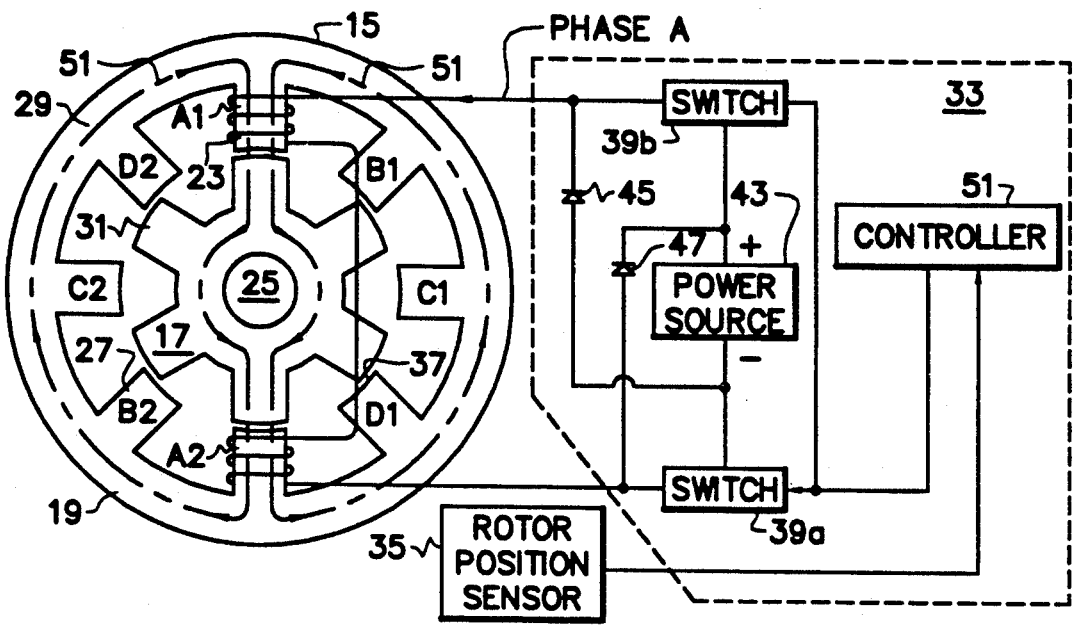
FIG. 1 is a schematic diagram of an SR motor illustrating a single phase of the motor energized by a conventional control system.

Turning to the drawings and referring first to FIG. 1, a typical three-phase, prior art switched reluctance (SR) motor 15 is characterized by a rotor 17 without windings, permanent magnets or a commutator. A stator 19 is characterized by a relatively small number of copper phase windings (only one pair of series connected coils $A_1$ and $A_2$ is shown for phase A) and with very short end windings 23.

The rotor 17 which rotates about a steel shaft 25 is simply a stack of laminations comprising a magnetically permeable steel alloy. As suggested by FIG. 1, each rotor lamination is cut to form a number of salient poles that extend radially outwardly from the axis of rotor rotation and are circumferentially evenly spaced about the periphery of the rotor 17.

As with the rotor 17, the stator 19 is preferably formed by a stack of laminations made from a magnetically permeable steel alloy. In order to cause rotation of the rotor 17 as explained hereafter, the stator includes a number of salient poles 27 which is unequal to the number of salient poles 31 on the rotor 17. The stator poles 27 extend radially inward from an annular yoke 29 and are circumferentially and evenly spaced about the yoke.

The SR motor of FIG. 1 has eight stator poles 27 and six rotor poles 31. Coils on diametrically opposite stator poles 27 are connected in series to form phase windings—four in this case (A, B, C and D). For ease of illustration, coil pairs B, C and D are not shown in FIG. 1; instead, the stator poles associated with these phase windings are labeled "B", "C" and "D" accordingly. As those familiar with SR motors will appreciate, different combinations of the numbers of stator and rotor poles may be used—for example, a six stator pole and four rotor pole combination will give a three-phase machine with a nominal 30° angle of rotor rotation for each commutated phase. The eight stator pole and six rotor pole motor shown in FIG. 1 has a step angle of 15°. For identification of particular stator poles 27, reference hereinafter will be made to the stator pole and its coil—e.g., in FIG. 1 the stator poles of phase A are 27 ($A_1$) and 27 ($A_2$), where $A_1$ and $A_2$ comprise the coil pair for the phase A winding.

The excitation of coils $A_1$ and $A_2$ of the phase A winding magnetizes both the stator 19 and the rotor 17. As illustrated, this excitation produces a torque causing the rotor 17 to align its poles 31 with the excited stator poles 27 ($A_1$) and 27 ($A_2$) The polarity of the torque does not depend on the polarity of the current since the rotor 17 is always attracted to the stator 19 and will rotate to an orientation that provides a minimum reluctance path between energized poles. Consequently, the SR motor requires only unipolar current through the phase windings and from a drive generally indicated as 33 in FIG. 1. Sequential excitation of the phase windings A, B, C and D provides a "one-phase-on" operation that causes the rotor 17 to rotate and synchronously align the poles 31 of the rotor with those excited on the stator 19. In a conventional manner, a shaft position sensor 35 provides to the drive 33 the rotor position information necessary for synchronization of the rotor rotation and phase excitation.

Torque in the SR motor is proportional to the rate of increase of flux carried by the rotor and stator poles 31 and 27, respectively, as they rotate into alignment. Both air-gap reluctance and pole reluctance simultaneously decrease as the rotor 17 rotates into a position that is radially aligned with the energized stator poles 27 ($A_1$) and 27 ($A_2$). It is known that magnetic saturation in the air gap region 37 and pole tips 38 of the switched reluctance motor can significantly enhance the torque output. In this regard, the desire for pole tip saturation to increase output torque dictates a radial length of an air gap 37 as small as possible for reasonable manufacturing ease.

Referring to the drive 33 for the SR motor shown in FIG. 1, only the basic electrical circuit used to drive the phase A coils $A_1$ and $A_2$ of the SR motor is illustrated. It will be appreciated that the drive 33 includes similar electrical circuitry for phases B, C and D. For the phase A winding, when the switch pair 39 of the drive 33 is closed, current builds up in the coils $A_1$ and $A_2$ under the excitation of direct voltage from a power source 43. When the switch pair 39 is opened, the current transfers to the diodes 45 and 47, and the coils $A_1$ and $A_2$ see the reverse voltage which thereby quickly removes and recovers the energy stored in the winding. This excitation is applied to each of the phase windings A, B, C and D in sequence and, for motoring operation, each pulse causes the most adjacent rotor pole to move towards alignment with the energized stator pole.

Figure 2A:
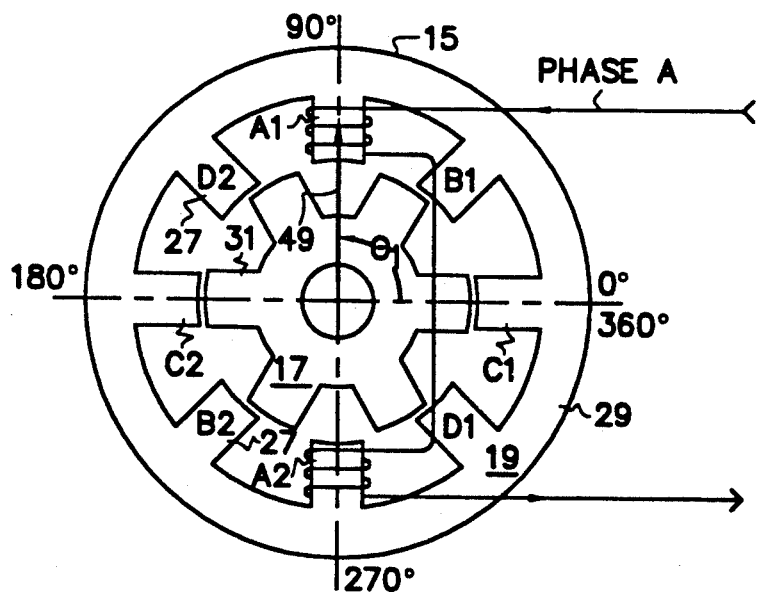
FIGS. 2a-2c are each schematic diagrams of a SR motor illustrating a discrete position of a rotor of the motor as it rotates about an axis in response to energization of different phases such as the illustrated phase A.
Figure 2B:
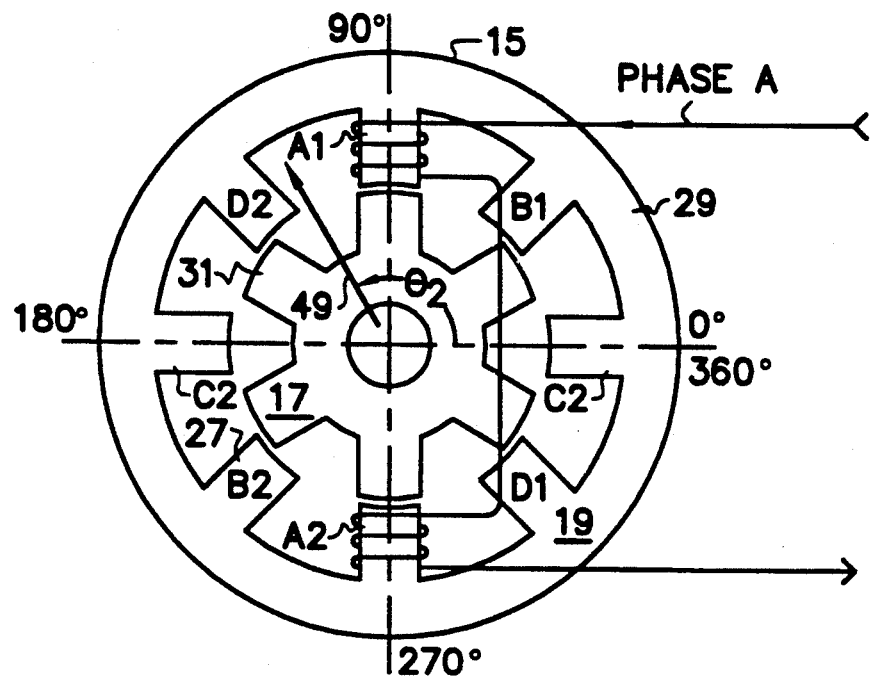
Figure 2C:
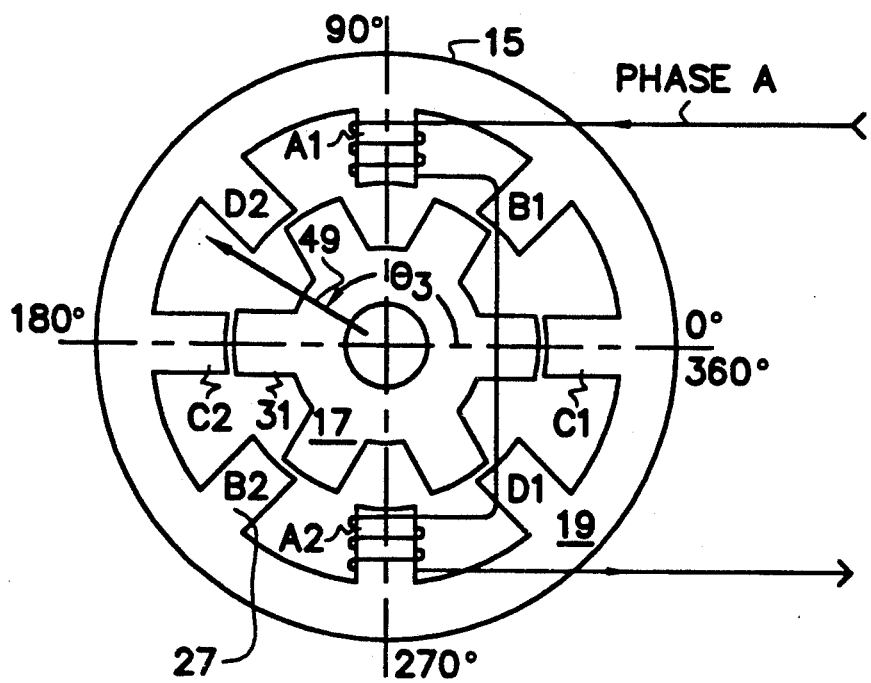

Referring to FIGS. 2a-2c, as indicated by the arrow 49, the rotor 17 steps around in the opposite direction to the sequence of stator pole excitations as is well known in the art. FIGS. 2a-2c illustrate the rotor 17 of the motor 15 in FIG. 1 rotating through a "stroke angle", which is the mechanical angle of rotation between points of low inductance for a reference winding. In FIGS. 2a-2c, the reference coil is $A_1$ of the phase A winding. It will be appreciated by those familiar with the operation of electronically commutated motors that the coil $A_2$ of the phase A winding experiences a stroke angle (consecutive points of low inductance) in synchronism with coil $A_1$. Furthermore, it will also be appreciated by those familiar with electronically commutated motors that each pair of coils in a phase winding experiences synchronized stroke angles. Using the arrow 49 as a reference vector that rotates with the rotor 17, the angle of the rotor can be expressed as an angle $\Theta$ with respect to a polar coordinate system mapped onto the stator as illustrated in FIGS. 2a-2c, where the origin is the axis of rotation for the rotor 17 and the positioning of the 0/360° mark is arbitrary. Sometime during each stroke angle for any pair of poles of a given phase, the associated windings will be energized in order to generate a motoring torque at the rotor 17. For example, in FIGS. 2a-2c the coils $A_1$ and $A_2$ will be energized sometime after the angle $\Theta_1$ in FIG. 2a and commutated sometime before the angle $\Theta_2$ in FIG. 2b. The stroke angle of the motor in FIGS. 2a-2c is 60°. For an eight stator, six rotor pole arrangement as shown in FIG. 1, one complete revolution of the rotor requires six stroke angles of the phase sequence A, B, C and D.

It should be noted that thinking in terms of "steps" of rotor rotation as suggested by FIGS. 2a-2c is only helpful from the viewpoint of understanding the rotation of the rotor 17. In practice, current pulses to the windings are controlled by the controller 51 in response to the rotor position sensor 35 to occur at specific angles $\Theta$ of the rotor. The commutation of the current is controlled to occur at specific rotor angles $\Theta$ in order to give a smooth rotational transition of a rotor pole 31 past an attracting stator pole 27 in order to ensure continuous rotation without cogging. This generally means that a phase winding is substantially de-energized before the stator and rotor poles 27 and 31 align.

Figure 3:
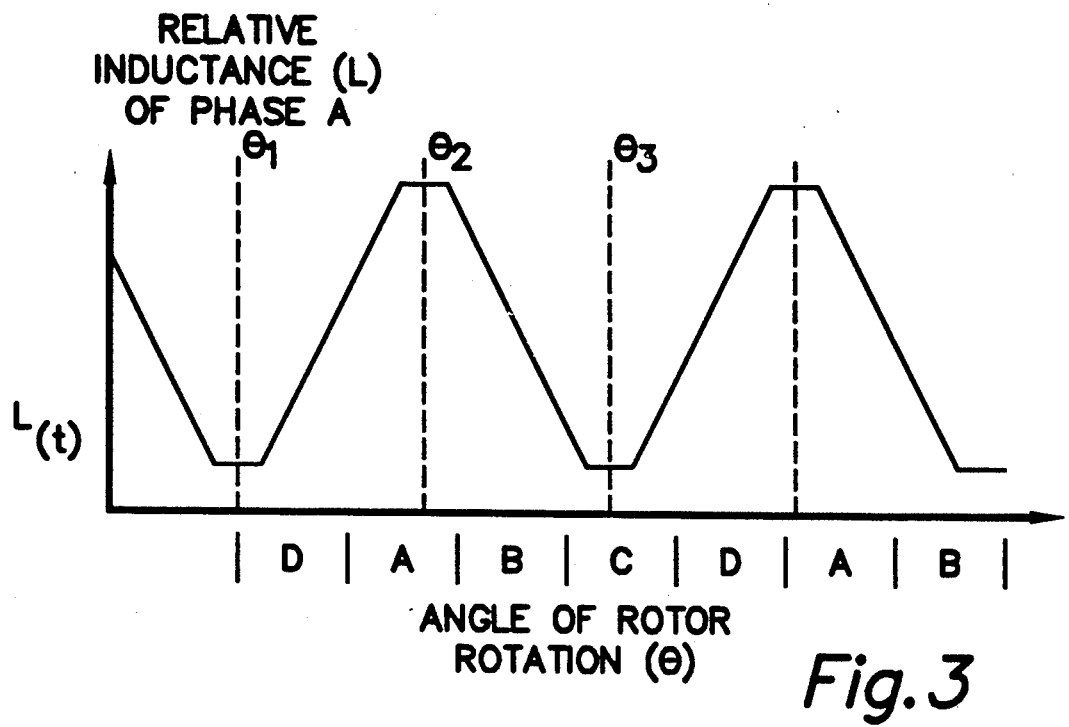
FIG. 3 is an exemplary and idealized graph illustrating a cyclic variation of inductance L experienced by the phase A winding of FIGS. 2a-2c relative to the mechanical angles $\Theta_1$, $\Theta_2$ and $\Theta_3$ of the rotor.

Briefly turning to a more detailed discussion of motor operation, motoring torque in a SR motor is produced when a phase winding is energized during the time interval when the inductance of the phase is increasing (i.e., a rotor pole is approaching a stator pole of the phase). As previously indicated, a given phase winding undergoes a cyclic variation of inductance as rotation occurs. Making the simplistic assumption that the inductance L of a winding is independent of the current through the winding, this variation is shown in FIG. 3 for the coil $A_1$ in FIGS. 2a-2c. A first rotor pole is misaligned with the stator pole at a rotor angle of $\Theta_1$ (FIG. 2a). With continued rotor rotation, the alignment of a rotor pole occurs at $\Theta_2$ (FIG. 2b). As can be seen the inductance L of the coil (and thus the winding) is the greatest when a rotor pole is aligned with the stator pole.

Figure 4:
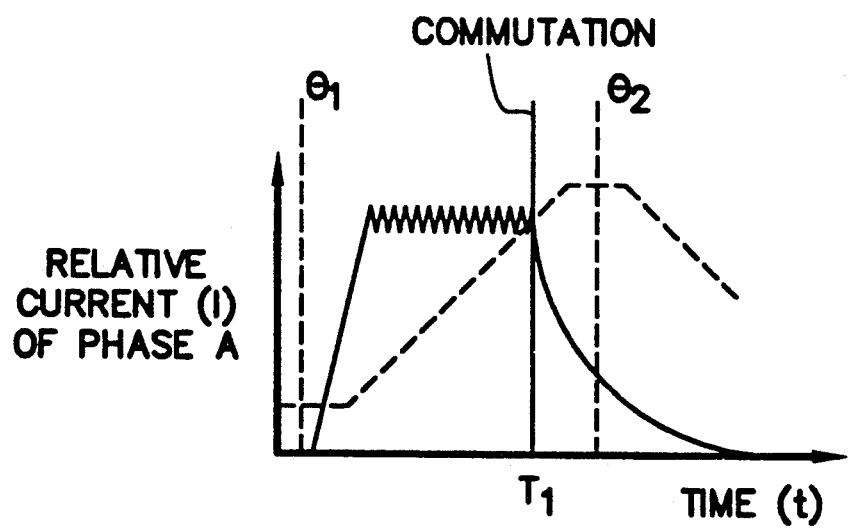
FIG. 4 is an exemplary graph of a current waveform for phase A in FIGS. 2(a)-2(c) relative to the time t of mechanical rotation of the rotor, illustrating how the commutation of phase A typically leads the mechanical rotation of the rotor when the motor is controlled to provide continuous rotation.

For continuous rotation of the SR motor, the timing of a typical energizing current pulse applied to a winding relative to the time of rotor angle $\Theta_1$ is shown in FIG. 4. Energy is controllably supplied during the period up to the commutation time $T_1$, by the opening and closing of the switch pair 39 (see FIG. 1)—i.e., pulse-width modulation. To ensure motoring operation with no more than acceptable ripple torque, the commutation time $T_1$ occurs at a time before the mechanical angle $\Theta_2$ is reached; that is, the phase winding is commutated before stator and rotor poles 27 and 31 align. Also, by commutating during a time of rising inductance L, a maximum amount of energy may be converted to motoring and a minimum to generating. In other words, during excitation of a phase by a current I, some of the energy is converted to mechanical output, some is stored in the magnetic field and some is lost in the copper or iron. During the period after commutation, the continued rotation of the rotor 17 partly returns the energy to the supply and partly converts it to further mechanical output and losses.

With opposing stator poles 27 ($A_1$) and 27 ($A_2$) associated with the phase A winding as is shown in FIG. 1, the coils $A_1$ and $A_2$ are wound about the poles so that one pole face 27a has a north polarity and the other has a south polarity. With this configuration, the flux path is, as indicated by the solid lines 51, through the rotor 17 and around the back iron 29 of the stator 19. Upon energization of stator poles 27 ($B_1$) and 27 ($B_2$) by the phase B winding, the associated coils (not shown) will set up a flux pattern similar to that developed by windings $A_1$ and $A_2$ of phase A. The flux patterns for the stator poles 27 ($C_1$) and 27 ($C_2$) of phase C and 27 ($D_1$) and 27 ($D_2$) are similar.

Figure 5:
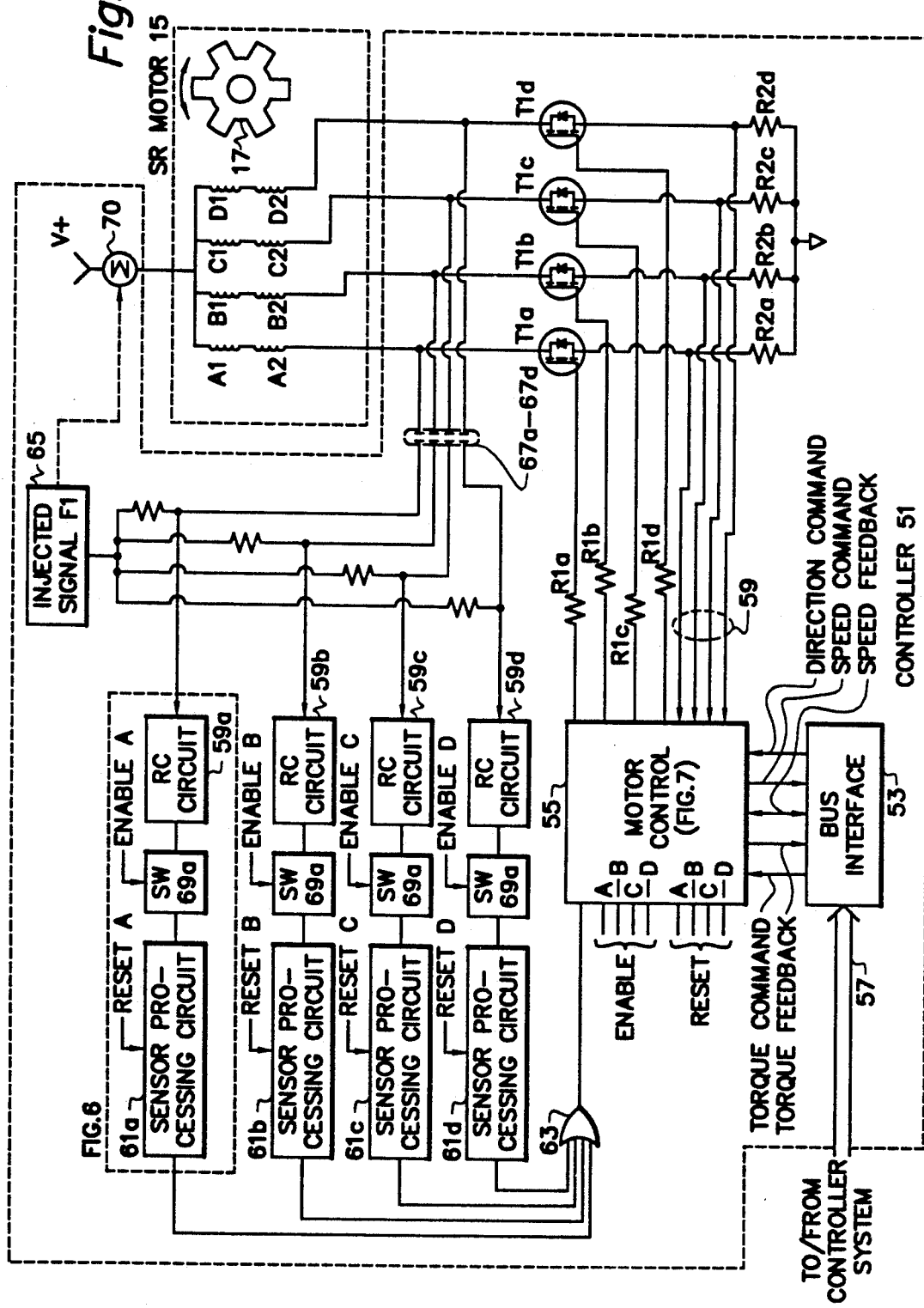
FIG. 5 is a block diagram of a circuit in accordance with a first embodiment of the invention for controlling a brushless commutated motor, wherein the relative position of the rotor is determined by a sensor processing circuit that responds to a low-level signal injected into a tank circuit incorporating the phase windings of the motor.

In the illustrated embodiment of the invention shown in FIG. 5, an interface 53 includes a control system for the SR motor 15 of FIG. 1 and 2a-2c. The interface 53 receives information from and delivers information to a system controller (not shown), which coordinates the control of the motor 15 with other functions executed by the system. In its simplest form, the system controller is a human operator and the bus interface 53 comprises panel switches.

The bus interface 53 is of conventional construction and provides speed, direction and torque commands to a motor control circuit 55 as they are received from the system controller over a system bus 57. Actual speed and torque values of the motor 15 are derived by the motor control circuit 55 and fed back to the system controller via the bus 57.

Current for driving the coils of each phase winding is derived from a power source V+. Each pair of phase coils $A_1$ and $A_2$, $B_1$ and $B_2$, $C_1$ and $C_2$ or $D_1$ and $D_2$ is in a series connection with one of the switches T1a–T1d, which are preferably power MOSFETs as illustrated. A drive signal from the motor control circuit 55 is applied to the gate of each switch T1a–T1d by way of resistors R1a–R1d. Each drive signal turns one of the switches T1a–T1d on and off at a switching frequency $F_s$. By closing one of the switches T1a–T1d, a current is caused to flow through the respective power circuit comprising the series connected pair of coils, the switch and one of the resistors R2a–R2d.

In a conventional fashion, each of the resistors R2 function to sense the current through the power circuit and provide an indication of the magnitude of the current to the motor control circuit 55 by way of lines 59. As is well known in the art of motor controls, the motor control circuit 55 responds to the signals on the lines 59 by pulse-width modulating (PWM) the signal delivered to the gates of the switches T1a–T1d in order to maintain the current at a level that achieves the desired torque.

In accordance with one important aspect of the invention, in order to resolve the position of the rotor 17, a low-power signal of a frequency $F_1$ is injected into a tank circuit that includes a phase winding of the SR motor. An output of the tank circuit is processed and analyzed for the purpose of synchronizing the operation of the switches T1 with the position of the rotor 17 relative to the poles of the stator. The tank circuit comprises inductive (L), resistive (R) and capacitive (C) elements. The inductive element (L) is one of the phase windings of the SR motor. As explained in connection with FIG. 3, the value of the inductance of the phase windings is dependent on the angle of the rotor. The values of the resistive (R) and capacitive (C) elements are constants and, therefore, the tank circuit's characteristic responses to the injected low-power signal are dependent on the position of the rotor.

A detection circuit is responsive to the output of the tank circuit for detecting a predetermined event resulting from relative changes in one of the characteristic responses of the tank circuit. Because the detection circuit detects a relative change, the absolute value of the inductive element (L) of the tank circuit need not be known. Because of the nature of the detected event, however, the absolute value of the inductive element (L) must be within a range of values. Therefore, the control system incorporating the detection circuit of the invention can be applied to related motors without adjustment of the values for the resistive (R) and capacitive (C) elements, but motors of substantially independent designs will likely require independent determinations of the values for the resistive (R) and capacitive (C) elements.

In the first illustrated embodiment of the invention (FIGS. 5-10), a tank circuit is associated with each of the power circuits. In the second illustrated embodiment (FIGS. 11-19), only one tank circuit is employed in connection with one of the power circuits. In both embodiments, however, the tank circuit incorporates both stator coils that define the winding for a single phase. As used herein, the term "phase winding" is intended to include all of the stator coils driven by a phase or any portion of these coils. For example, the "phase winding" incorporated into the tank circuit may be all of the coils driven by a phase or it may be one of two coils driven by a phase.

The resistive (R) and capacitive (C) elements of each tank circuit are in parallel with one of the switches T1a–T1d; whereas, each pair of phase windings is in series with one of the switches T1a–T1d, and they are also in series with the resistive (R) and capacitive (C) elements of one of the tank circuits. This arrangement results in the operation of the tank circuits not interfering with the functioning of the power circuits. Moreover, the frequency $F_1$ of the injected signal is much greater than any switching frequency $F_s$ of the motor and, therefore, they substantially operate in separate frequency domains, which serve to further isolate the functioning of the power circuits from the functioning of the tank circuits and the associated detectors. More specifically, the range of switching frequencies $F_s$ includes zero at the low end (a static condition) to a maximum that is typically dependent on design characteristics of the motor itself.

In the motor illustrated in FIGS. 2a–2c and 5, there are eight (8) stator poles and six (6) rotor poles. For one complete revolution of the rotor, each phase must be energized six times. For a high speed of 30,000 revolutions per minute, each phase is commutated 180,000 times per minute or a frequency $F_s$ of 3000 Hz. By way of contrast, the frequency $F_1$ of the injected signal is preferably in the range of 20,000 to 100,000 Hz.

In the first embodiment of the invention illustrated in FIG. 5, the values of the capacitive (C) and resistive (R) elements are selected to tune the tank circuit to have a resonant envelope that includes the frequency $F_1$ for at least some value of the resonant frequency $F_0$ as it varies in time with the inductance L of the phase winding in the tank circuit. In this regard, the resonant frequency $F_0$ for the series connected tank circuit of the invention can be expressed as $$F_0 = \frac{1}{2\pi \sqrt{LC}},$$

where L is the dynamic value of the inductance of the phase winding and C is the static value of the capacitive element. As the inductance L of the phase winding varies between minimum and maximum values in response to rotation of the rotor 17 as indicated in FIG. 3, the resonant frequency $F_0$ varies between maximum and minimum values.

When the difference between the resonant frequency $F_0$ and the frequency $F_1$ is at a minimum, a detection circuit detects a maximum amplitude of the output signal from the tank circuit, which is at the frequency $F_1$. In order for the maximum amplitude of the output from the tank circuit to occur at the mechanical angle $\Theta_1$—i.e., the poles of the rotor are misaligned with the two diametrically opposite stator poles 27 of the phase winding, the injected frequency $F_1$ must be greater than or equal to the maximum value of the resonant frequency $F_0$. Preferably, the frequency $F_1$ is greater than the resonant frequency $F_0$, but within the resonant envelope as defined by the maximum resonant frequency so as to ensure the output of the tank circuit experiences a detectable increase in amplitude.

In the first embodiment illustrated in FIG. 5, each of the detection circuits for the tank circuits comprises a sensor processing circuit 61a–61d that detects the resonant amplitude of the frequency $F_1$ and provides an indication of the timing of the detection to the motor control circuit 55. This indication of the timing of the resonance is used by the motor control circuit 55 to control the timing and commutation of the drive signals to the switches T1a–T1d.

Each pair of phase windings $A_1$ and $A_2$, $B_1$ and $B_2$, $C_1$ and $C_2$ and $D_1$ and $D_2$ is incorporated into a tank circuit 59a–59d as illustrated in FIG. 5. The output of each tank circuit 59a–59d is applied to a respective sensor processing circuit 61a–61d when the associated one of the enabling switches 69a–69d is closed. The parallel outputs from the sensor processing circuits 61a–61d are applied to an OR gate 63, which supplies the four outputs in a serial fashion to an input of the motor control circuit 55. How the motor control circuit responds to the signals from the detection circuits will be discussed in greater detail in connection with FIG. 8.

In order to generate the injected signal $F_1$, a source generator 65 is either capacitively coupled to each of the drive circuits by way of capacitors 67a–67d. Alternatively, the signal $F_1$ may be injected by way of a transformer coupling at node 70 in FIG. 5. Applicants prefer capacitive coupling of the generator 65 since transformer coupling requires placement of a secondary winding in the power circuit, which may introduce undesirable losses into the system. Furthermore, capacitive coupling may be used to inject the signal into a node in each of the power circuits connecting the pair of phase windings and the associated one of the switches T1a-T1d as illustrated. The generator 65 is of a conventional configuration and the capacitive coupling is accomplished simply by adding a capacitor between the generator and the power circuit so as to decouple the output of the generator 65 from the DC voltage of the power source V+. Both the transformer and capacitive coupling methods work well but for the reasons listed above, the capacitive coupling is the preferred method.

Sometime during each stroke angle of the rotor 17, the difference between the injected frequency $F_1$ and the resonant frequency $F_0$ can be expected to reach a minimum and, therefore, the output of the tank circuit associated with the reference phase winding can be expected to reach a maximum amplitude as the resonant frequency $F_0$ shifts in value in response to the changing inductance of the phase windings. As discussed in greater detail in connection with the second embodiment, the minimum difference between the injected and resonant frequencies $F_1$ and $F_0$, respectively, can also be expected to provide a minimum phase difference between the injected signal and the output of the tank circuit.

The "event" of a maximum amplitude/minimum phase shift at the output of the tank circuit can be expected to occur during a certain portion of each stroke angle. This maximum amplitude/minimum phase shift occurs before the optimum turn on time of the respective motor phase. Thus, the motor speed and saturation/load effects are minimal since the phase winding has only mutual magnetic flux (from the other phase windings) when it is part of the active tank circuit. The predictability of the timing of the maximum amplitude/minimum phase shift event within a stroke angle allows each of the switches 69a-69d associated with one of the detection circuits to selectively enable the tank circuit for only a portion of the time period of a stroke angle. By enabling the tank circuit only when necessary to detect the maximum amplitude of the output signal, any power dissipation caused by the resistive element (R) of the tank circuit is minimized. Furthermore, the selective enablement of the tank circuit also aids in establishing good noise immunity properties for the control system.

Also, sometime during each stroke angle referenced to a phase winding, the output of the associated one of the sensor processing circuits 61a-61d is reset for detecting the next event. The enabling signals to the switches 69a-69d and the reset signals to the sensor processing circuits are provided by the motor control circuit as explained hereinafter in connection with FIG. 8.

The bus interface 53 accepts digital signals from the system controller bus 57. The interface 53 decodes the digital instructions from the bus to provide the direction command (forward/reverse), torque and speed magnitude commands for the motor control 55. The motor control 55 provides torque and speed feedback signals which the bus interface 53 encodes and makes available to the system controller bus 57.

Figure 6:
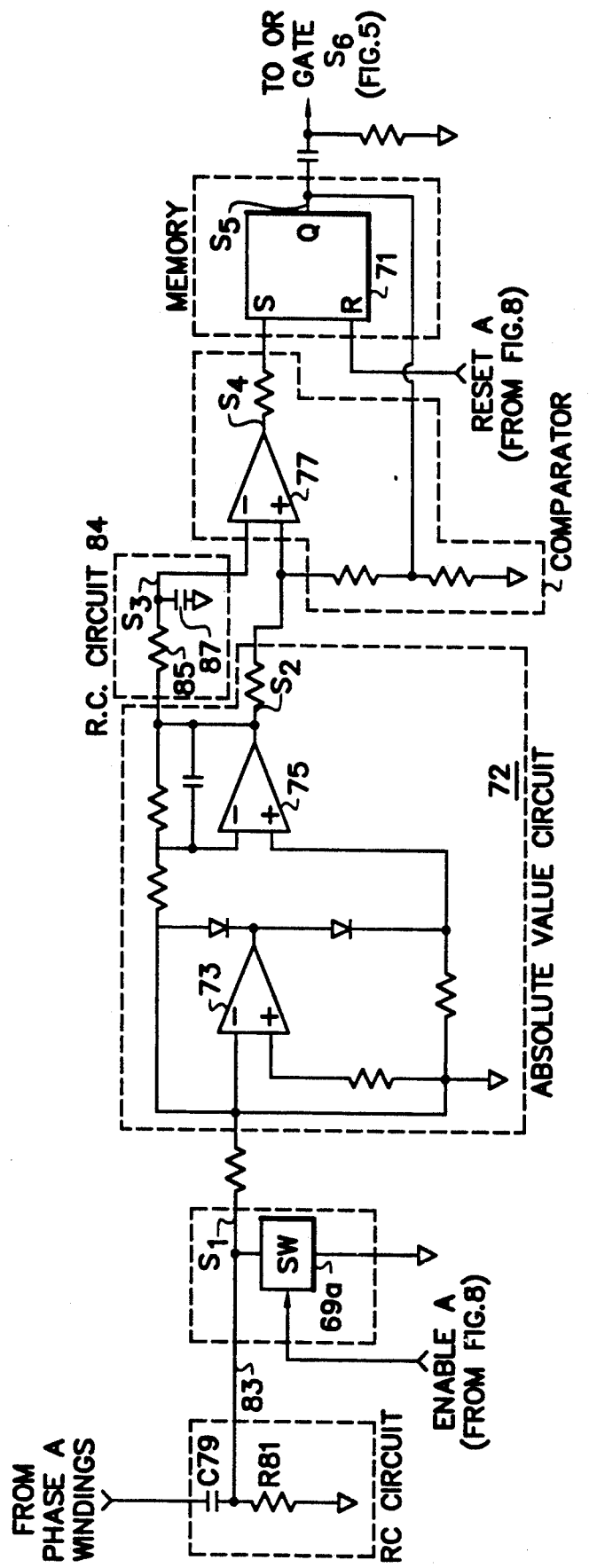
FIG. 6 is a detailed circuit diagram of the sensor processing circuit of FIG. 5.

Referring to FIGS. 5 and 6 for the first embodiment, each of the sensor processing circuits 61a-61d is comprised of an absolute value circuit 72 composed of amplifiers 73 and 75, a comparator 77 and a binary state memory 71. Because each of the sensor processing circuits 61a-61d are identified, only 61a associated with phase A is illustrated in detail herein. The absolute value circuit 72 tracks the absolute value of the amplitude of the envelope of the frequency $F_1$ appearing at the output of the tank circuit and also maintains an average value of that absolute value.

With the switch 69a closed, the output of the tank circuit is shorted to ground as indicated in FIG. 6. The switch 69a may be a conventional transistor whose base is driven by the "ENABLE A" signal from the motor control circuit 55. With the "ENABLE A" signal active, the output of the tank circuit is released from ground by the switch 69a. As indicated in FIG. 6, the output of the tank circuit is taken at the node between the series connected capacitive (C) and resistive (R) elements, which are capacitor 79 and resistor 81, respectively.

The operational amplifiers 73 and 75 in their absolute value circuit configuration function to full-wave rectify the signal $S_1$ at the output 83 of the tank circuit, which is at the injection frequency $F_1$. In this regard, the output of tank circuit is shown as waveform $S_1$ in FIG. 8 for 1½ stroke angle. The switch 69a is enabled during the time period in a stroke angle that the phase windings of phases C and D are energized. Therefore, the signal $S_1$ at the output 83 is pinned at a reference ground for the first half of the stroke angle (i.e., the firing of phases A and B, assuming the stroke angle for phase A is the firing sequence A, B, C and D). Because of the geometry of the motor 15 in FIG. 1, and the illustrated one-phase-on control scheme, a pole of the rotor can be expected to misalign with a pole of the stator (FIG. 2a) sometime during the firing of phases C or D. Therefore, the "ENABLE A" signal is active during the firing of phases C and D so that the output 83 is free to communicate the signal $S_1$ to the operational amplifier 73 of the sensor processing circuit.

Figure 8:
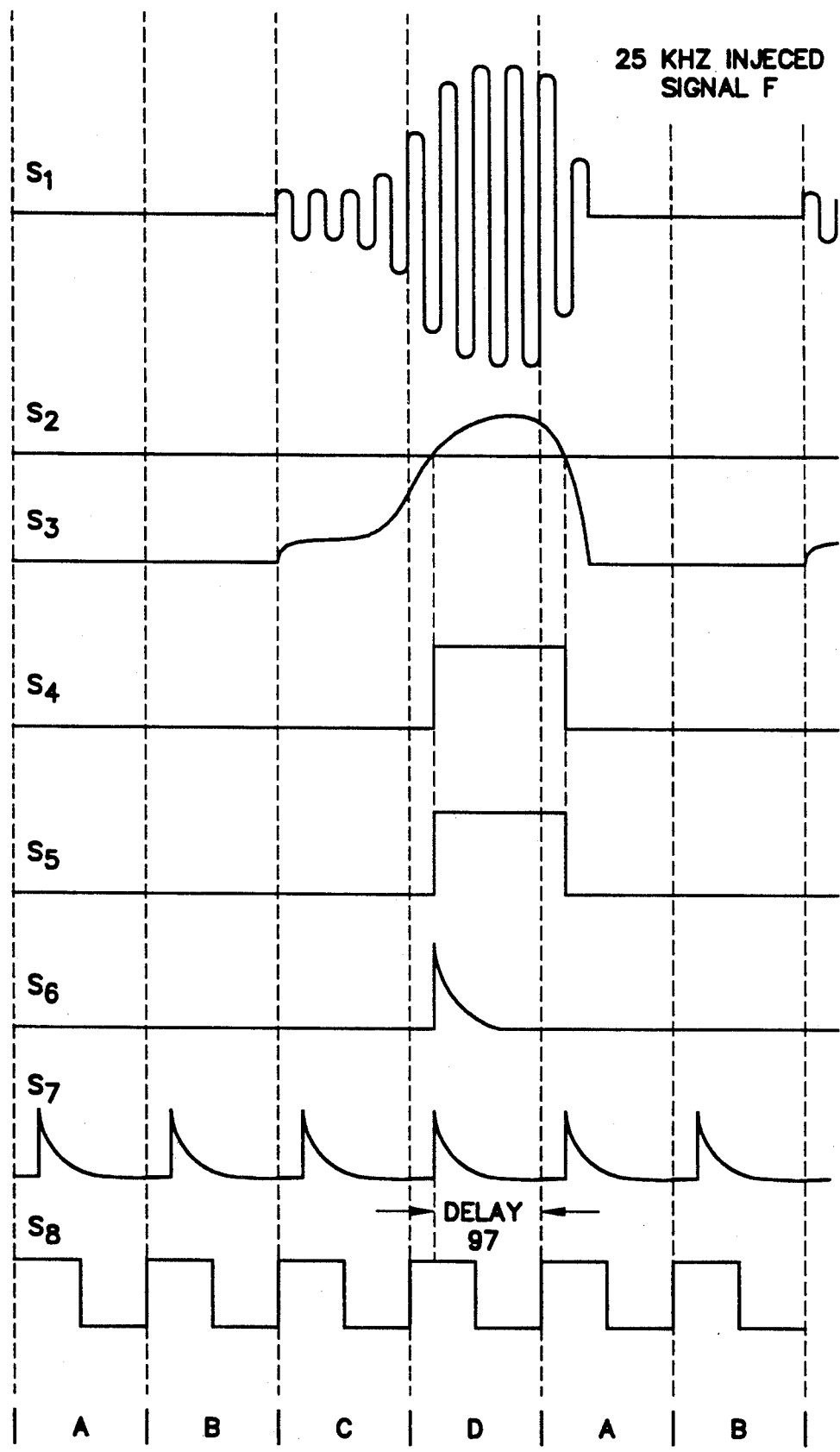
FIG. 8 is a timing diagram comprising a series of waveforms $S_1$-$S_8$ for various signals within the sensor processing circuit and motor control circuit illustrated in FIGS. 6 and 7.
Figure 9:
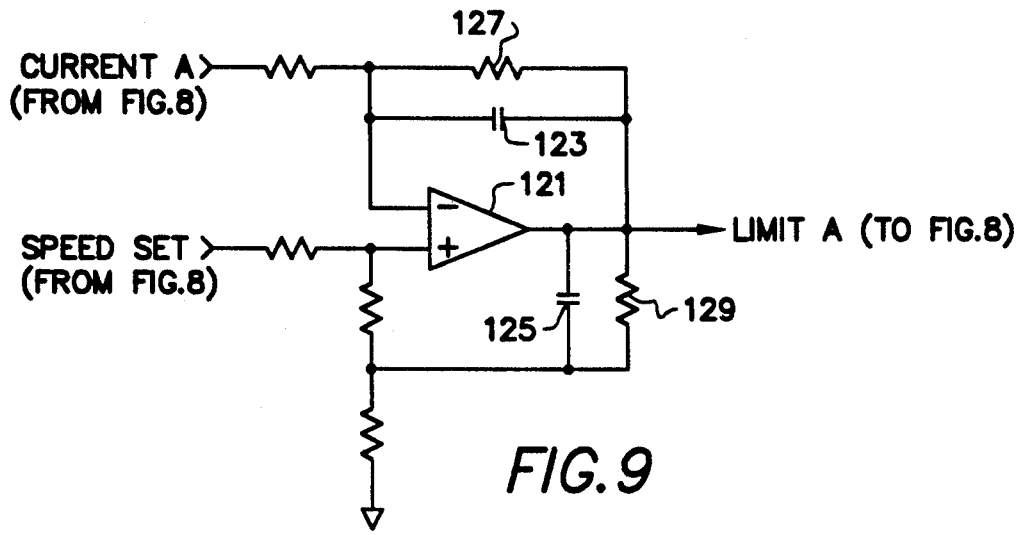
FIG. 9 is a diagram of a subcircuit of the motor control circuit shown in FIG. 7 that limits the power delivered to the windings of the SR motor.

The signal $S_1$ is full-wave rectified by the absolute value circuit 72 to provide a signal $S_2$ illustrated in FIG. 8 as waveform $S_2$, which is the amplitude envelope of the waveform signal $S_1$. A moving average value of the signal $S_2$ is provided by an RC circuit 84 comprising a resistor 85 and a capacitor 87. The moving average of the signal $S_2$ is illustrated by the waveform $S_3$ in FIG. 8. The two signals of waveforms $S_2$ and $S_3$ are provided to the inputs of the comparator 77 comprising an operational amplifier 78, which generates an output signal of waveform $S_4$ that is a bi-state signal. The state of the signal $S_4$ is dependent on whether the instantaneous amplitude of the output from the tank circuit (waveform $S_2$) is less or greater than the average amplitude of the output (waveform $S_3$). The signal $S_4$ at the output of the comparator by the waveform $S_4$, is a square wave as illustrated and the rising edge of the square wave sets high the Q output of the SR flip-flop 71. The Q output of the SR flip-flop 71 is illustrated by the waveform $S_5$ in FIG. 8. The Q output of the SR flip-flop 71 is capacitively coupled to one of the inputs of OR gate 63 by way of series capacitor 88 so that the signal of the waveform $S_6$ delivered to the OR gate is a momentary pulse as illustrated.

Each of the sensor processing circuits 61a-61d provides a signal to the OR gate 63 in FIG. 5 that is similar to waveform $S_6$ in FIG. 8. Because each sensor processing circuit 61a-61d is responding to a different tank circuit incorporating a unique pair of phase windings, the ORed signals result in a stream of spaced signals as indicated by waveform $S_7$ that mark the timing of the sequential alignment of rotor and stator poles.

Figure 7:
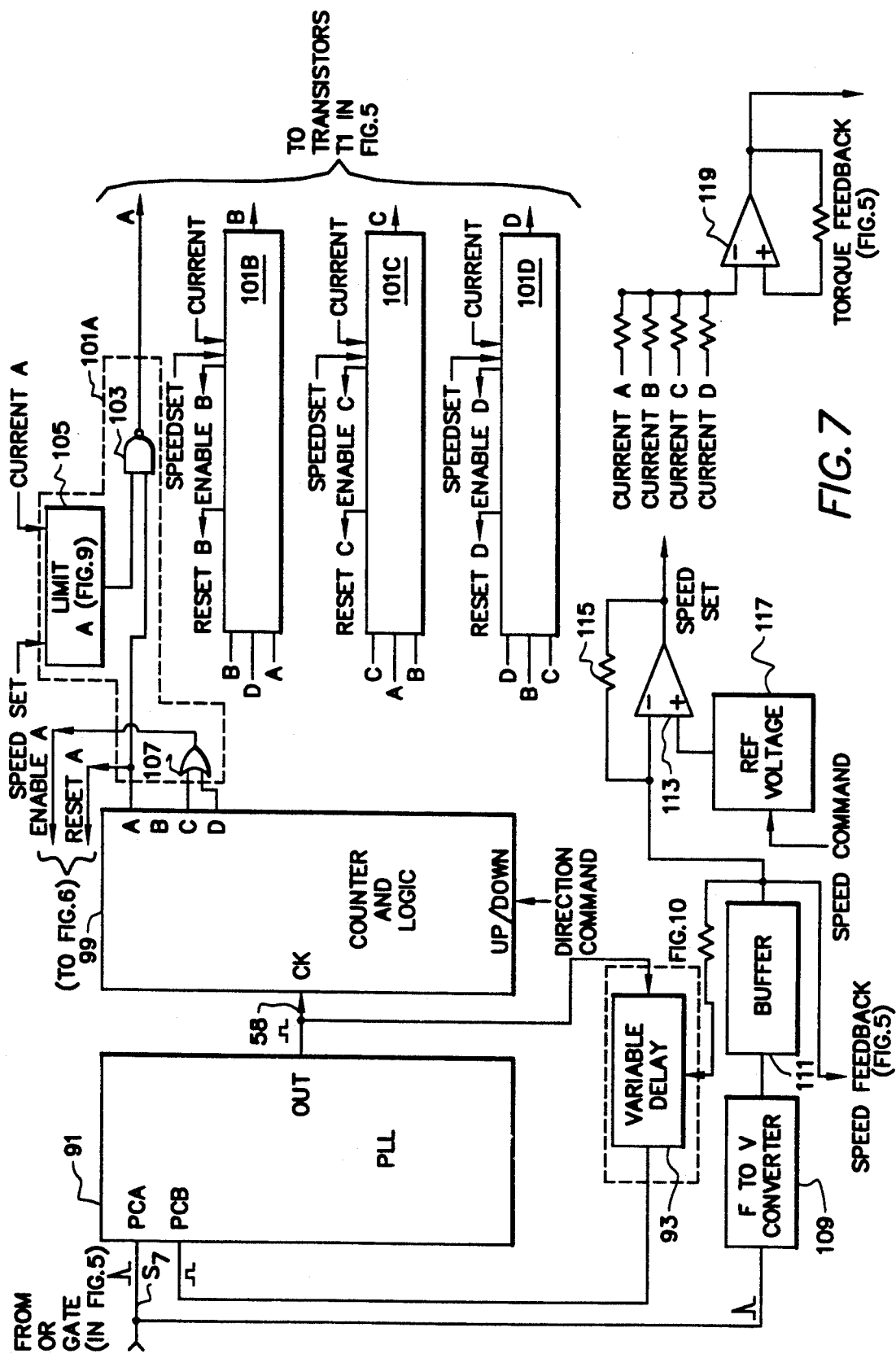
FIG. 7 is a circuit diagram of the motor control generally shown in FIG. 5.

The signals of waveform $S_7$ are delivered to the phase comparator A (PCA) input of a phase locked loop (PLL) 91, which is part of the motor control circuit illustrated in FIG. 7. The PLL 91 may be a commercially available device such as a Motorola MC14046B. The PLL 91 functions to phase lock the signals of waveform $S_7$ at the input PCA with the signals at the input PCB. The signals at the phase comparator B (PCB) input are derived from a feedback network whose input is the output signals of the PLL 91.

The timing function provided by the waveform $S_7$ may be realized using only one or two of the sensor processing circuits if the decreased accuracy and response time degradation are acceptable. If less than all four of the sensor processing circuits 61a–61d are used, the frequency of the VCO output 58 of the PLL 91 is not used to directly sequence the firing of phases A–D. Instead, an appropriately frequency divided pulse train derived from the PLL/VCO output is used. For example, if two sensor processing circuits are used, the pulse frequency of waveforms $S_7$ and $S_8$ would be half the frequency shown for the four sensor circuit of FIG. 5. For such a case, the VCO output is divided by two by the counter and logic circuit 99 before it is applied as an input to the variable delay 93.

The feedback network in the circuit of FIG. 7 comprises a variable delay circuit 93 that receives the output signals of the PLL 91 and a NAND gate 95 whose two inputs receive the output from the variable delay circuit 93 and the output from the PLL. The variable delay circuit 93 effectively inserts a phase delay, identified as 97 in waveforms $S_7$ and $S_8$, between the input signal of the waveforms $S_7$ and the output signals of waveform $S_8$ in FIG. 8. The delay 97 is intended to ensure the phase windings are fired and commutated at rotor angles that ensure a continuous motoring operation rather than a cogging rotation that is similar to the functioning of a stepper motor.

As explained in greater detail in connection with FIG. 10, the delay 97 inserted by the variable delay circuit 93 is a fixed time up to a predetermined speed and thereafter decreases. A fixed time delay will give a linear relationship between motor speeds and "delay angles." A delay angle is the angle $\Theta$ the rotor 17 turns during a particular time delay period 93. At low speeds, the angle delays are small and insignificant. At high speeds, large angle delays occur. Applicants have found that the fixed time delay for speeds up to 10,000 RPMs provides adequate compensation for assuring a timing relationship as illustrated in FIG. 3 between the excitation of a phase and the current buildup in the phase windings. Above 10,000 RPMs, the delay 97 inserted by the variable delay circuit 93 is adjusted in order to hold a constant mechanical angle. The higher velocity of the rotor simply requires an adjustment in that a phase winding may have to be turned on sooner as the velocity of rotor increases since the reaction time of the phase winding to an energy pulse remains unchanged.

From the output of the PLL 91, the waveform $S_8$ is fed to a clock (CK) input of a conventional up/down counter and logic circuit 99, having active output A, B, C and D that are sequenced in response to consecutive pulses at the clock input. Each output provides a gate drive to one of the switches T1a–T1d, which is in series with one of the pairs of phase windings $A_1$ and $A_2$, $B_1$ and $B_2$, $C_1$ and $C_2$ or $D_1$ and $D_2$. Specifically, output A drives the gate of the switch T1a associated with phase windings $A_1$ and $A_2$, output B drives the gate of the switch T1b associated with phase windings $B_1$ and $B_2$, etc.

The outputs A–D of the counter and logic circuit 99 can be sequenced to count up (i.e., the sequence A, B, C and D) or count down (i.e., D, C, B and A). The direction of the count will determine whether the pairs of phase windings are sequenced in a clockwise or counterclockwise direction, which determines the direction of rotation of the rotor 17. A direction command to the UP/DOWN input of the counter and logic 99 thus controls the direction of rotor rotation. The direction command is derived from the system controller in FIG. 5 by way of the bus interface 53.

Each of the base drive signals A, B, C and D from the counter and logic 99 is waveshaped in one of the pulse-width modulators (PWM) 101a–101d. Because each of the PWM 101a–101d is internally identical to the others, only the structure of PWM 101a is illustrated in detail in FIG. 8. It will be appreciated that the following description of the PWM 101a applies equally well for each of the other PWM 101b–101d, except the inputs to them are different combinations of the outputs from the counter 99.

In the PWM 101a, the output pulse A is applied to one input of a AND gate 103. The other input to the AND gate 103 receives a signal from a limit circuit 105, which is a pulse-width modulated signal responsive to speed and torque characteristics of the motor 15. The AND gate 103 effectively impresses onto the output pulse A the pulse-width modulation of the limit circuit 105. This pulse-width modulated signal directly drives the gate of the switch T1a associated with the phase windings $A_1$ and $A_2$. An OR gate 107 receives the C and D outputs from the counter and logic 99 and provides its output to the switch 69a, which enables the tank circuit during phase C and D of a stroke angle. As can be seen by the waveforms $S_1$–$S_8$ of FIG. 8, for a motoring operation, the energization sequence of the pairs of phase windings in advance with respect to rotor angle such that phase pairs $C_1$ and $C_2$ or $D_1$ and $D_2$ can be expected to be energized at the time of rotor misalignment with the stator poles of the phase A coils $A_1$ and $A_2$. The enable signal is similarly derived at the other PWM 101b–101d for switches 69b–69d, respectively. The output A of the counter and logic 99 directly provides the reset signal to the RS flip-flop 71.

In order to control the variable delay 93 and limit circuits 105, a frequency-to-voltage converter 109 receives the output from OR gate 63. The frequency of the signals comprising the waveform $S_7$ is indicative of the motor RPM. By converting this frequency to a voltage and comparing the voltage to a reference voltage that represents a command speed, a speed error or set signal can be established. In the first illustrated embodiment, the voltage from the frequency-to-voltage converter 109 is delivered to a conventional buffer 111, which in turn provides the voltage to an operational amplifier 113 configured as a gain amplifier by way of a negative feedback comprising a resistor 115. The voltage from the buffer 111 is applied to the negative input of the operational amplifier and a reference voltage 117 corresponding to the command speed is applied to the positive input. The value of the voltage at the output of the operational amplifier 113 is linearly dependent on the difference between the reference voltage 117 and the voltage from the buffer 111. Because the voltage from the buffer 111 reflects the actual speed of the motor 15, it is fed back to the system controller as a speed feedback signal. Also, an operational amplifier 119 is configured to sum the currents sensed by the resistors R2a-R2d (FIG. 5) and provide a torque feedback to the system controller.

The speed error signal from the operational amplifier 113 is received by each of the limit circuits 105 and the voltage from the buffer 111, reflecting actual motor speed, is delivered to the variable delay circuit 93. With respect to each of the limit circuits 105 (see FIG. 9), it comprises an operational amplifier 121 configured with positive and negative feedback networks. Each of the networks is comprised of a capacitance 123 or 125 and a resistance 127 or 129 in parallel. These networks provide a hysteresis effect where, once turned off, the amplifier 121 will not come back on until the drive current decreases to a fraction (e.g., 80%) of the turn-on level. The voltage at the positive input to the operational amplifier 121 is the speed error signal from the operational amplifier 113 in FIG. 7. The speed error signal is a dynamic DC voltage, whereas the signal at the negative input to the operational amplifier 121 is a stream of pulses representive of the current pulses generated in the drive circuit for the phase A winding.

When the coils of the phase A winding are energized, the current through the phase winding builds as indicated by the illustration in FIG. 4. If the voltage from the sensing resistor R2 becomes too great with respect to the speed error or set voltage, the output of the operational amplifier 121 goes low and the AND gate 103 (FIG. 7) is disabled. The amplifier 121 remains low until the phase current falls to the 80% level. As a result of disabling the AND gate 103, the output A from the counter and logic 99 is cut off from the base of switch T1a. With the base drive removed, the switch T1a opens and the current through phase A quickly falls. Correspondingly, the voltage at the negative input of the operational amplifier 121 quickly falls to the 80% level and the output of the operational amplifier returns to a high state, which enables the AND gate 103 to pass the signal from output A of the counter 99. This cycle of disabling and enabling the AND gate 103 continues until the signal at output A goes low. During the time output A is active, the value of the speed set determines the duty cycle of the pulse-width modulation derived from the limit circuits 105 since a constant load is assumed for the illustrated embodiment.

Figure 10:
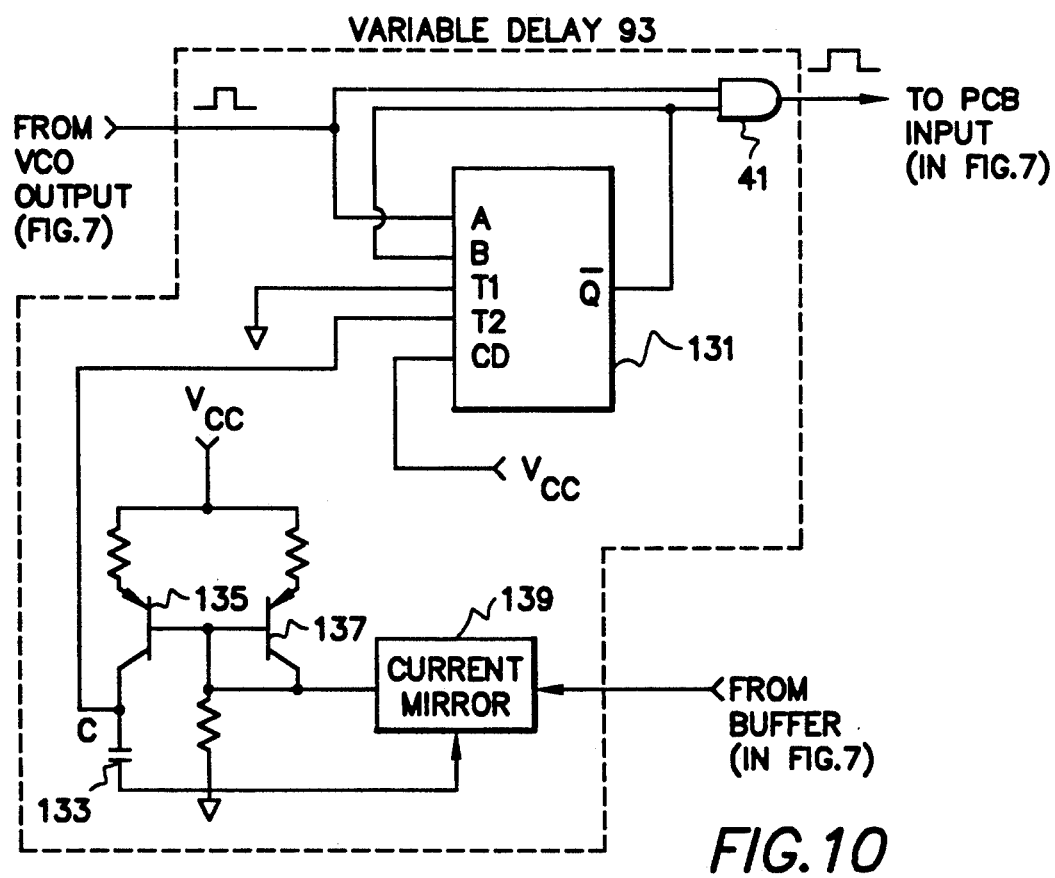
FIG. 10 is another diagram of a subcircuit of the control circuit in FIG. 7 that ensures the electrical phenomenon detected by the sensor processing circuit maintains a known relationship with the mechanical angle of the rotor for varying speed conditions.

The variable delay circuit 93 as illustrated in FIG. 10 uses a variable duration monostable multivibrator or one-shot 131. The one-shot 131 is implemented using a Motorola MC14528 or similar device. Typically, an RC network sets the timing of this device. In FIG. 10, the one shot 131 has a timing capacitor 133 but the typical resistor is replaced by a current source composed of a pair of transistors 135 and 137 and supporting resistors. The "on" time of the one-shot 131 is proportional to the value of the capacitor 133 and the amplitude of the current through the transistors 135 and 137. This current is in turn proportional to the current in a current mirror 139, which is proportional to the speed signal from the buffer 111 in FIG. 7. After the threshold of the current mirror 139 is exceeded, the "on" time of the one shot 131 decreases as the motor speed increases.

A delay versus speed characteristic as shown in FIG. 20 is thus realized that has a constant time (increasing angle) delay until the threshold of the current mirror is reached and then a decreasing time (constant angle) delay beyond the threshold. This delay, illustrated as 97 in waveforms $S_7$, and $S_8$ of FIG. 8, is initialed by the VCO output of the PLL 91. The signal $S_8$ from the VCO output trips the one-shot 131, but an AND gate 141 output remains low until the $\overline{Q}$ output of the one-shot returns to high. Thus, the leading edge of the VCO output (waveform $S_8$) is delayed by the duration of the "on" time for the one-shot 131. Since the PLL 91 of FIG. 7 forces the leading edges of its inputs (PCA and PCB) to be nearly coincident, the feedback delay caused by the one shot 131 forces the VCO output of the PLL 91 to lead the PCA input of the PLL 91 (waveform $S_7$ of FIG. 8) by this same delay duration.

Turning to a second embodiment of the invention illustrated in FIGS. 11-19, the values of the capacitive (C) and resistive (R) elements are selected as in the first embodiment to tune the tank circuit to have a resonance $F_0$ so that the injected frequency $F_1$ is preferably bracketed by the minimum and maximum values of the resonant frequency as it varies in time with the inductance (L) of the phase winding incorporated into the tank circuit. Like the first embodiment, as the inductance (L) of the phase winding varies between minimum and maximum values in response to rotation of the rotor 17 as indicated in FIG. 3, the resonant frequency $F_0$ varies between maximum and minimum values. Unlike the first embodiment, however, the second embodiment of the invention is designed to be sensitive to changes in the phase of injected frequency $F_1$ caused by the tank circuit. When the resonant frequency $F_0$ is at a maximum, the phase lead of the signal (FIG. 15) at the output of the tank circuit is a maximum with respect to the signal $F_1$ injected into the tank circuit. When the resonant frequency $F_0$ is at a minimum, the phase lag of the signal at the output of the tank circuit is a maximum with respect to the injected signal $F_1$.

When the resonant frequency $F_0$ equals the frequency $F_1$ of the injected signal, the output of the tank circuit is in phase with the injected signal—i.e., the phase shift is zero. Because the second embodiment senses phase shift instead of amplitude, the tank circuit may be tuned differently. Specifically, the values of resistive element (R) is picked in the first embodiment to provide a high quality factor (Q). In the second embodiment, however, the value of the resistive element is selected to provide a relatively large phase shift for the purpose of providing greater resolution of the position of the rotor 17. Furthermore, in the first embodiment, the injected signal is selected to have a frequency that is preferably slightly greater than the maximum resonant frequency $F_0$, whereas the frequency $F_1$ of the injected signal in the second embodiment is preferably within the band of resonant frequencies $F_0$, as discussed more fully hereinafter.

Figure 11A:
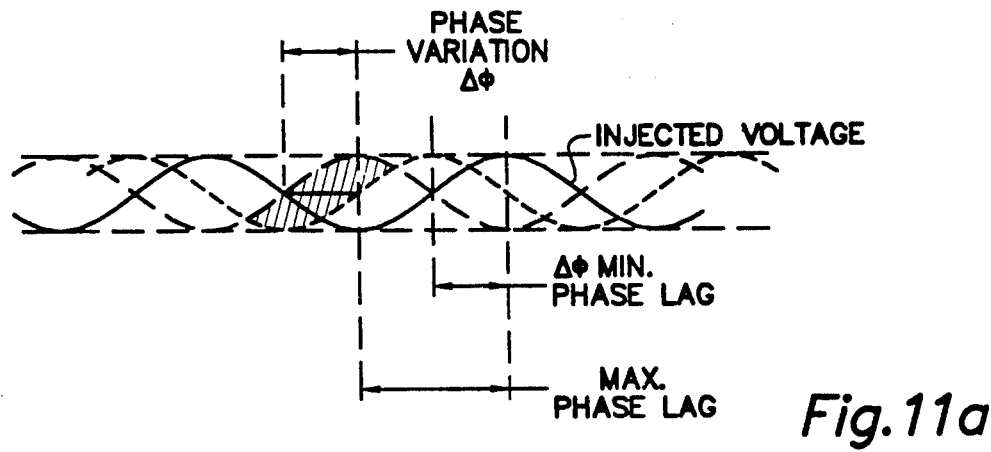
FIGS. 11a-11b are idealized waveform diagrams illustrating in accordance with a second embodiment of the invention alternative phase relationships between a low level signal injected into the windings of one phase and an output signal from a tank circuit incorporating the windings and responsive to the injected signal.
Figure 11B:
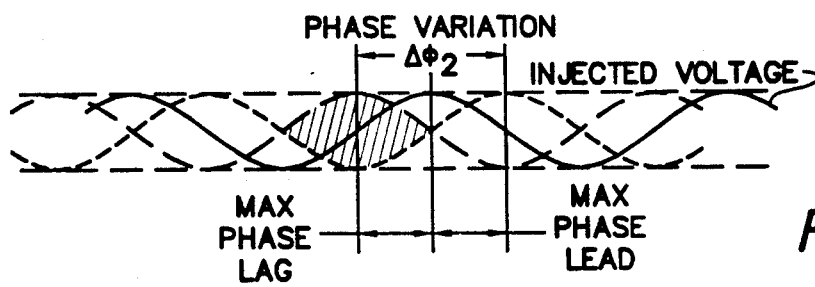

Referring to FIGS. 11a-11b, by correctly selecting the values of the capacitive (C), inductive (L) and resistive (R) elements of the tank circuit and the frequency of the injected signal $F_1$, the signal at the output of the tank circuit will vary in phase angle $\phi$ with respect to the injected signal $F_1$. If the values of the capacitive (C) and resistive (R) elements for the tank circuit are chosen in proper proportions to the inductance (L) of the motor winding incorporated into the tank circuit, the frequency of the injected signal $F_1$ can be selected to provide either of the relationships illustrated in FIGS. 11a or 11b.

In the approach shown in FIG. 11b, the values of the tank circuit and the injected signal $F_1$ are chosen so that the phase angle $\phi$ of the output from the tank circuit varies with respect to the injected signal between maximum phase lag and maximum phase lead. In terms of the resonant frequency $F_0$, the tank circuit is tuned to have a range of resonant frequencies that includes the frequency $F_1$ of the injected signal.

In FIG. 11a, the phase shift $\Delta\phi$ varies between a minimum and maximum phase lag. In terms of resonant frequency $F_0$, the tank circuit is tuned to have a range of resonant frequencies that does not include the frequency $F_1$ of the injected signal.

Detection of maximum phase leads and lags as illustrated in FIG. 11b is preferred over the detection of minimum and maximum phase lags because the phase shift $\Delta\phi$ is greater as indicated by a comparison of the shaded areas in the two waveforms of FIGS. 11a-11b. The larger phase shift provides the best resolution of rotor position.

It is important to note that the injected frequency, $F_1$ can be phase shifted itself to provide more phase lead with respect to the output of the tank circuit. In FIG. 15, component 157a provides additional phase lead to the injected signal.

Figure 12:
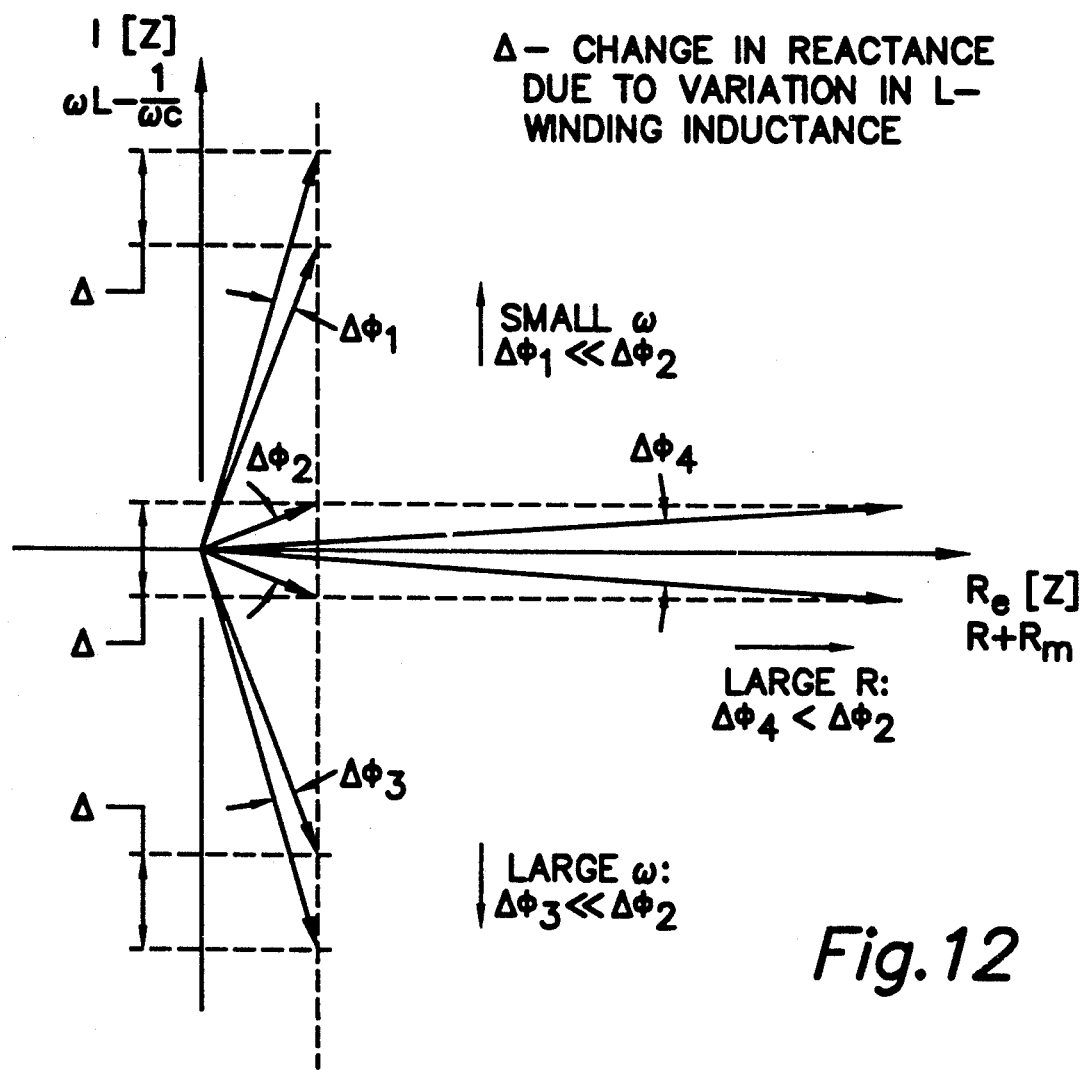
FIG. 12 is an exemplary impedance phasor diagram illustrating the effects on the phase relationship between the injected signal and the output from the tank circuit resulting from changes in the reactance of the tank circuit, assuming several different starting conditions.

The impedance phasor diagram of FIG. 12 illustrates the sensitivity of the dynamic range of the phase angle $\phi$ to both reactive Im[Z] and resistive Re[Z] portions of the tank circuit, as well as to the injected frequency $F_1$, where the reactive portion Im[Z] equals, $$\left(\omega L - \frac{1}{\omega C}\right).$$

The impedance phasor diagram of FIG. 12 confirms that the largest values of phase shift $\Delta\phi$ occur between maximums of leading and lagging phases. Therefore, it is desirable to balance the reactance of the inductive element (L) with the reactance of the capacitive element (C) in the tank circuit in order to create a phase shift between phase lead and phase lag. It also appears desirable to pick smaller values for the resistive element (R) of the tank circuit. Then, as the value of the inductance (L) of a pair of phase windings varies, the resultant impedance vector sweeps out an angle (phase shift) about the real axis that has the greatest dynamic range shown—e.g., $\Delta\phi_2$ in FIG. 12.

The following listing defines the various parameters illustrated in FIG. 12:

$\omega$ = radian frequency ($2\pi F_1$), where $F_1$ is the injected frequency;

I [Z] = imaginary portion of the impedance phasor; and Re [Z] = real portion of the impedance phasor, where $\bar{Z}$ = I[Z] + Re[Z] = impedance vector or phasor that represents the magnitude and phase angle of the output signal $S_{10}$ (see FIG. 15) of the tank circuit.

Each pair of impedance vectors or phasors in FIG. 12 define phase shift angles $\phi$ as follows:

$\Delta\phi_1$ = phase shift for tank circuit whose inductive reactance is larger than its capacitive reactance (motor resistance (Rm) only as resistive element);

$\Delta\phi_2$ = Balanced inductive and capacitive reactance (motor resistance only);

$\Delta\phi_3$ = Larger capacitive reactance than inductive (motor resistance only); and $\Delta\phi_4$ = Balanced inductive and capacitive reactance with resistive element (R) of tank circuit added to motor resistance (Rm).

Like the first embodiment of the invention, the second embodiment of the invention illustrated in FIG. 14 incorporates a detection circuit for the tank circuit, which comprises a sensor processing circuit 110. Unlike the first embodiment, however, the sensor processing unit 110 of the second embodiment detects the phase shift of the signal $S_{10}$ recovered from the tank circuit 111 and provides an indication of the timing of the detected phase shift to a motor control circuit 113. This indication of the timing of the phase shift is used by the motor control circuit 113 to control the timing and commutation of the drive signals to the switches T1a-T1c.

In keeping with the invention, one phase winding, either coil pairs $A_1$ and $A_2$, $B_1$ and $B_2$, $C_1$ and $C_2$ or $D_1$ and $D_2$, is incorporated into the tank circuit as illustrated in the circuit of FIG. 14. The output of the tank circuit 111 is applied to the sensor processing circuit 110 by way of a switch 114. Just as in the first embodiment, the output from the sensor processing circuit 110 is applied to an input of the motor control circuit 113. The motor control circuit 113 is substantially the same as the motor control circuit 55 of the first embodiment. Because only a single tank circuit 111 and sensor processing circuit 110 are employed in this second embodiment, however, the timing signal delivered to the motor control circuit 113 is one fourth the frequency of the signal delivered to the motor control circuit 55 in FIG. 5, assuming the two embodiments are associated with the same motor 15 operating at the same RPM.

Like the first embodiment, a source 116 of the injectedd signal $S_9$ can be placed to inject the signal into various nodes of the control circuit. The important object being that the injected signal $S_9$ not interfere with the power signals in the power circuits, yet still drive a tank circuit incorporating one of the phase windings. As explained in greater detail in connection with FIG. 15, the source 116 injects the signal $S_9$ by way of capacitive coupling at node 118, or alternatively, by way of transformer coupling at node 120 in FIG. 14.

Because their operation has already been discussed in detail in connection with the first embodiment and FIG. 5, the power circuits comprising the pairs of phase windings A-D, the FETs T1a-T1d and the sensing resistors R2a-d will not again be discussed in connection with FIG. 14 and the second embodiment. The functioning of the motor control circuit 113 with respect to the power circuits is identical to that described in connection with the first embodiment and, therefore, will also not be discussed again in connection with the second embodiment. Likewise, the bus interface 122 between the motor control circuit 113 and the system controller (not shown) is substantially the same as described in connection with the first embodiment and need not be described again in connection with this second embodiment of the invention.

Because the detection circuit in the second illustrated embodiment includes only one tank circuit and one sensor processing circuit, the interface between the detection circuit and the motor control circuit 113 is somewhat simplified. However, because the second embodiment senses phase shift of the injected signal $S_9$ and not resonant amplitude as in the first embodiment, the implementation of the switch 114 and sensor processing circuit 110 in FIG. 14 are substantially different than the implementation of the switches 69a-d and sensor processing circuits 61a-d in the first embodiment of FIG. 5. Accordingly, the reset and enable signals provided to the sensor processing circuit 110 and switch 114, respectively, are also different than the reset and enable signals provided by the motor control circuit 55 of the first embodiment.

FIG. 15 illustrates the detailed structure of the sensor processing circuit 110, the switch 114 and the motor control circuit 113. The latter is illustrated in detail only with respect to its interfacing with the sensor processing circuit 110 and the switch 114 since, as previously stated, the remainder of the motor control circuit is essentially the same as the motor control circuit 55, which is illustrated in detail in FIG. 7. For example, the circuitry of the reference speed circuit 200 and the speed set circuit 201 are essentially the same as set forth in connection with FIG. 7 of the first embodiment.

Figure 13:
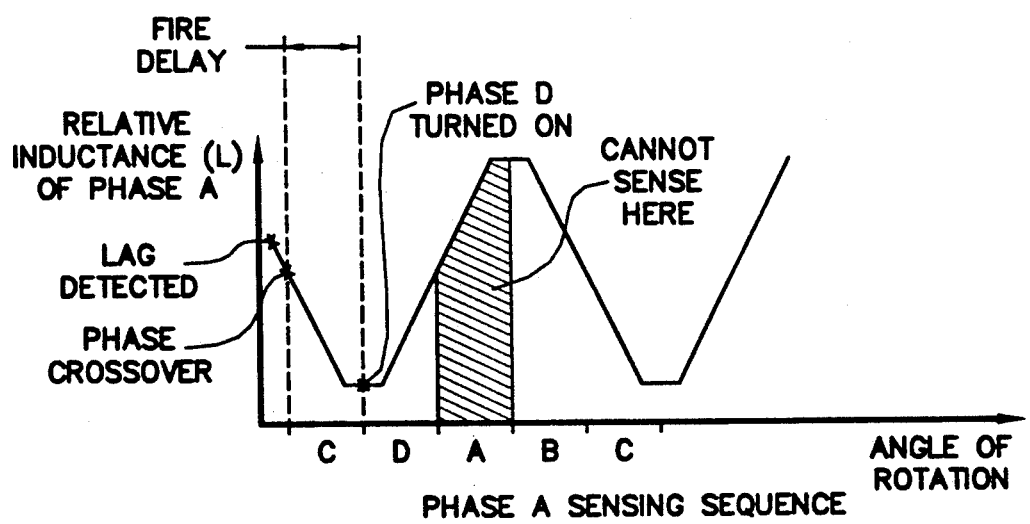
FIG. 13 is an exemplary and idealized timing diagram similar to the graph of FIG. 3, illustrating the relationship between the (a) cyclic variation of inductance L experienced by the phase A winding of FIGS. 2a-2c, (b)

Turning to FIG. 15, which illustrates the detailed construction of the sensor processing circuit 110, the switch 114 and their interfacing with the motor control circuit 113, a PLL 117 of the motor control circuit 113 receives at its PCA input the output from the sensor processing unit 110. Phase D is used to provide the PCB input to the PLL because D is also providing the firing command for that phase which is desirable since, as FIG. 13 shows, when the inductance of phase A, the sensed winding is at a minimum, the rotor pole is approximately where you would want it to be to energize the D winding. Thus, the phase "event" being detected is in advance of this point—i.e., sometime during the energizing of phases B or C. While it is preferable to fire on a phase subsequent to the measured phase, any order, so long as the timing is carefully managed would be satisfactory. Also, any one, or a multiplicity of phases can be sensed to control the power firing.

It will be appreciated that in the second embodiment only one timing signal from the sensor processing unit 110 is provided for every stroke angle or sequence of phase firings A, B, C and D. In contrast to this approach, the first embodiment of FIGS. 1–10 utilizes a sensor processing unit for each phase of the motor 15, so a timing signal is provided for the firing of each phase. In the second embodiment, the frequency of the VCO output of the PLL 117 must be a multiple of the timing signal at the PCA input. In this regard, the frequency of the timing signal is multiplied by the number of phases in the motor 15 (four in the illustrated embodiment).

As in the first embodiment, in order to generate the injected signal $S_9$, a source generator 119 in FIG. 15 is capacitively coupled at node 118 in FIG. 14 or inductively coupled at node 120 in FIG. 14. As in the first embodiment, applicants prefer capacitive coupling since transformer coupling requires placement of a secondary winding in the power circuit, which may introduce undesirable losses into the system. The generator 119 is of a conventional configuration and the capacitor coupling is accomplished simply by adding a capacitor 123 into the power circuit so as to separate the output of the generator 119 from the DC voltage of the power source V+. An alternative approach, if only one phase is sensed, is to use transformer coupling where the transformer is at the bottom of the tank circuit instead of the top.

In the second embodiment illustrated in FIG. 15, the sensor processing unit 110 incorporates a phase crossover detector 125 in order to detect when the phase of the injected signal, $F_1$, is equal to that of the output of the tank circuit. This point is called the minimum phase difference point, or the phase crossover point, and is where the output of the tank circuit goes from lagging the injected signal $F_1$ to leading it in phase. The values for the capacitive and resistive elements (C) and (R) of the tank circuit 111 are selected accordingly. Specifically, for phase crossover to occur, the frequency $F_1$ of the injected signal must be within the range frequencies for the resonant frequency $F_0$. The sensor processing unit 110 also includes a delay circuit 127 that inserts the delay 100 illustrated in waveform of FIG. 20.

Referring again to the schematic diagram of FIG. 15, the PLL 117 functions to phase lock the signal from the delay circuit 127 at the input PCA with the feedback signal at the input PCB. The signals at the PCB input are derived from a feedback network whose input is the D output signal of a phase fire counter 167. Unlike the first embodiment, no variable delay is inserted into the feedback network. In this second embodiment, the variable delay is provided by the delay circuit 127.

From the output of the PLL 117, the timing signal is fed to a clock (CK) input of the phase fire counter 167, which is a conventional up/down counter and logic circuit like that of FIG. 7, having active outputs A, B, C and D that are sequenced in response to consecutive pulses at the clock input. Each output provides a gate drive to the switch T1$a$–T1$b$ associated with one of the pairs of phase windings $A_1$ and $A_2$, $B_1$ and $B_2$, $C_1$ and $C_2$ and $D_1$ and $D_2$. Specifically, output A drives the gate of the switch T1$a$ associated with phase windings $A_1$ and $A_2$, output B drives the gate of the switch T1$b$ associated with phase windings $B_1$ and $B_2$, etc.

Like the counter and logic circuit 99 of FIG. 7, the phase fire counter 167 can be sequenced to count up (i.e., the sequence A, B, C and D) or count down (i.e., D, C, B and A). The direction of the count will determine whether the pairs of phase windings are sequenced in a clockwise or counterclockwise direction, which determines the direction of rotation of the rotor 17.

Each of the base drive signals A, B, C and D from the phase fire counter 167 is waveshaped in the pulse-width modulator (PWM) control 169. Because the PWM control 169 is internally identical to that illustrated in FIG. 7, it will not be discussed in detail in connection with this second embodiment.

The "event" of a minimum phase difference (e.g., crossover in the illustrated embodiment) can be expected to occur during a certain portion of each stroke angle. The predictability of the timing of the minimum phase difference event within a stroke angle allows the detection circuit of the invention to selectively enable the sensor processing circuit 110 for only a portion of the time period of a stroke angle. By enabling the sensor processing circuit 110 only when necessary to detect the minimum phase shift of the output signal, good noise immunity properties are established for the control system. Also, sometime during each stroke angle the output of the sensor processing circuit 110 is reset for detecting the next event of minimum phase shift.

In order to selectively enable and reset the sensor processing circuit 110, the switch 114 is inserted between the output of the tank circuit 111 and the input to the phase crossover detector 125. As shown in FIG. 15, the switch 114 comprises a noise suppression circuit 131, two AND gates 133 and 135, a lag detector 137 and three amplifiers REF, COMPI and COMP2. As in the first embodiment, the output of the tank circuit 111 is taken at the node between the series connected capacitive (C) and resistive elements (R), which are capacitor 139 and resistor 141, respectively.

When phase A is being turned on, the noise suppression circuit 131 disables the crossover detector 125 via the pair of AND gates 133 and 135. These AND gates 133 and 135 also allow the comparators REF and COMP2 to provide phase event information to the crossover detector 125. Therefore, the phase crossover detector 125 is disabled for the first ¼ of the stroke angle as can be seen in the illustration of FIG. 13 (i.e., the firing of phase A, assuming the stroke angle for phase A is the firing sequence A, B, C and D). Because of the geometry of the motor 15 and the illustrated one-phase-on control scheme, a pole of the rotor 17 can be expected to misalign with a pole of the stator 19 (FIG. 2a) sometime during the firing of phases B, C or D. Therefore, the crossover detector 125 is enabled during the firing of phases B, C and D as suggested by FIG. 13 so that the outputs of the comparators COMP2 and REF are free to communicate their outputs to the crossover detector of the sensor processing circuit 110.

The comparator COMP2 "squares up" the output signal of the tank circuit, whereas the comparator REF in FIG. 15 "squares up" the reference signal $S_1$ from the generator 119. The comparator REF is coupled to the generator 119 by way of an RC network 157a–b. The capacitor 157a also provides some phase lead to the injected signal. After these signals have been gated by the output of the noise suppression circuit 131, they enter the phase crossover detector 125 at the data and clock inputs, respectively.

Referring to FIG. 17, the detector 125 changes state at the $\overline{Q}_2$ output of flip flop 143 when the timing of the zero-crossing of the signal $F_1$ from the tank circuit first precedes, coincides with and then follows the zero-crossing of the reference signal $F_1$ from the comparator REF. This transition from a preceding to a following zero-crossing is an "event" called "phase crossover" and is uniquely related to a particular rotor/stator mechanical alignment. Two flip flops 143 and 145 and OR gates 146 and 148 are used in the detector of FIG. 17 to help prevent spurious zero crossings from cancelling the detection of a phase crossover registered at the output $\overline{Q}_2$. Thus, the crossover event must occur for two consecutive periods of the signal $F_1$ to allow $\overline{Q}_2$ to transition to its "crossover" state.

When the $\overline{Q}_2$ output of the flip flop 143 of FIG. 17 transitions to "crossover" state, the delay circuit 127 of FIG. 18 is preset and enabled to count, which results in an eventual output pulse to the phase locked loop (PLL) in FIG. 15. The OR gates allow the "phase D fired" signal from the delay function to reset the crossover detector. The delay 100 in FIG. 20b is intended to ensure the phase windings are fired and commutated at rotor angles Θ that ensure a continuous motoring operation rather than a cogging rotation that is similar to the functioning of a stepper motor.

As shown in FIG. 18, the delay circuit 127 consists of a presettable digital counter 147, which is clocked by the signal from the comparator REF. The length of the count is presettable, and can be either a fixed value (no frequency or load delay compensation) or dependent upon frequency and/or load fluctuations.

FIG. 20a illustrates the output of the tank circuit as the rotor 17 travels through approximately 100° of angle Θ. FIG. 20b shows the output of the $\overline{Q}_2$ output of the flip-flop 143 of the crossover detector 125 as illustrated in FIG. 17. The phase firing sequence below FIG. 20b shows the sequence of events at the phases of the motor 15.

When the output $\overline{Q}_2$ of flip flop 143 is low, the phase of the signal from comparator COMP2 is leading the phase of the signal from comparator REF. Thus, the phase of the tank circuit starts as a lagging phase, then crosses over and leads and then crosses back over to a lag as suggested by the two crossover points (dashed line) in FIGS. 20a–b. The third dashed line in FIG. 20b is when phase D is fired after detection of the first phase crossover. The period from crossover to the firing of phase D is a variable delay 100, which can be a function of frequency and possibly also load torque as discussed hereinafter more fully. The delay 100 is provided by the delay circuit 127.

As explained in greater detail in connection with the delay circuit 93 of FIG. 10 for the first embodiment, the delay 100 inserted by the delay circuit 127 is a fixed time up to a predetermined speed and thereafter decreases. A fixed time delay 100 will give a linear relationship between motor speeds and delay angles as indicated by the exemplary graph in FIG. 21. At low speeds, the delay angles are small and insignificant. At high speeds, large delay angles occur. Applicants have found that the fixed delay 100 for speeds up to 10,000 RPMs provides adequate compensation for assuring a timing relationship as illustrated in FIG. 3 between the excitation of a phase and the current buildup in the phase windings. Above 10,000 RPMs, the delay 100 inserted by the variable delay circuit 127 is adjusted in order to hold a constant mechanical angle as suggested by the graph in FIG. 21. The higher velocity of the rotor 17 simply requires an adjustment in that a phase winding may have to be turned on sooner as the velocity of rotor increases since the reaction time of the phase winding to an energy pulse remains unchanged.

FIG. 18 shows one implementation of the delay circuit 127 where both frequency and torque inputs are digitized via low resolution analog-to-digital (A/D) converters 149 and 151 that access a small (256 word) ROM 153, which generates the preset inputs to the counter 147. To derive the portion of the address to the ROM 152 used for frequency compensation, the A/D converter 149 can be implemented by a gated counter, which counts edges of the injected frequency $S_9$ for the interval between successive signals to the phase fire counter 167 The resulting count ranges from one to 26 (after pre-scaling) and is a four-bit quantity. The torque compensation portion of the ROM address bus 152 could be implemented by an integrator across a shunt in the phase A leg of the motor winding with a gated counter used to convert the motor current into a four-bit digital quantity.

These two four-bit quantities are combined to generate a unique address for the compensation ROM 153, which holds 256 values of delay 100. One of these delay values will be loaded into the presettable counter 147 each time a phase crossover is detected. The presettable counter 147 then counts until the present number of clocks (derived from the comparator REF) has occurred, at which time it sends a signal to the PCA input of the PLL 117, which results in a fire command to the phase fire counter 167.

Various other compensation approaches can be used here. For example, torque compensation may not be necessary for satisfying operation of the control system as set forth in this second embodiment. Because prototypes of the second embodiment have not as yet been fully tested, applicants cannot say for certain whether torque compensation is required using the phase shift detection scheme of the second embodiment or if other compensation schemes may be equally effective.

The purpose of the lag detector 137 in FIG. 15 is to provide the system of the invention with a certain threshold of phase margin that must be exceeded before the phase detector 125 is enabled. This provides a certain amount of hysteresis in the detection scheme, and prevents "PLL runaway" due to the rotor 17 lining up and stopping very near to the crossover detection point and causing oscillation of the control circuit, even though the rotor is not moving.

The output of comparator COMP1 is a phase-shifted output, which is similar to the output of comparator REF, but it is further leading in phase. FIG. 13 shows how the lag detector 137 sees sufficient lag during the firing of phase B to enable the phase detector via the AND gates 133 and 135 in FIG. 15. The output of the comparator COMP1 is phase compared to the output of the comparator COMP2 to determine when sufficient lag is present at the output of the tank circuit. The phase of the signal $S_9$ is phase shifted by an RC network 155a–b coupling the generator 119 to the input of the comparator COMP1. The amount of phase shift generated by the RC network 155a–b is selected to be equivalent to the amount of lag required from the output of the tank circuit prior to enabling the crossover detector 125.

Turning to the detailed structure of the lag detector 137 illustrated in FIG. 16, when the phase of the output of the tank circuit from the comparator COMP2 leads the phase of the signal from comparator COMP1, a flip-flop 158 passes a high signal to the $\overline{Q}_1$ output of the flip-flop. In turn, the high signal from the $\overline{Q}_1$ output is passed to the $\overline{Q}_2$ output of flip-flop 159, which enables the AND gates 133 and 135 and, thereby, enables the phase crossover detector 125. Flip-flop 159 synchronizes the $\overline{Q}_1$ output of flip-flop 158 to the frequency of the PLL 117. The AND gate 160 ensures that only during phase B is the lag detector 137 enabled to clock an output to $\overline{Q}_2$. In effect, the lag detector 137 requires the presence of a minimum lag at the output of the tank circuit before the phase crossover detector 125 is enabled, thereby ensuring a certain measure of noise immunity for the control system. Additional noise immunity is derived from the noise suppression circuit 131.

The noise suppression circuit 131 acts to "blank" the inputs to the phase crossover detector 125 when "predictable" noise occurs. FIG. 19 illustrates the construction of the noise suppression circuit 131 and shows that when the output of delay circuit 127 indicates that a winding phase is to be turned ON, the flip flops 161, 163 and 165 disable the AND gates 133 and 135 for two clock periods of the comparator REF. Other noise suppression circuitry which has been proposed, includes sharp band pass filtering of the tank circuit output and tuning the band pass filter so that the resonant frequency $F_0$ is de-tuned after phase crossover has occurred.

From the foregoing description of the two illustrated embodiments of the invention, it can be seen that the output of the tank circuit provides a means for resolving the position of the rotor 17 without the need of an intrusive sensor or electromechanical device such as an optical encoder for tracking the position of the rotor. No sensor attached to the motor itself is required. All sensing is done through existing power leads. By incorporating a phase winding of the motor 15 as the inductive (L) element of the tank circuit, the cyclical variation of the value of the inductive element resulting from the rotating rotor poles provides a cyclical variation of the resonant frequency $F_0$ of the tank circuit between maximum and minimum values. The cyclical variation of the resonant frequency $F_0$ is related to the mechanical angle $\Theta$ of rotor. In this regard, in an idealized environment the phase winding of the tank circuit experiences maximum inductance when stator poles of the phase winding are aligned with poles of the rotor. By contrast, when the phase winding of the tank circuit experiences minimum inductance, the stator and rotor poles are completely misaligned.

Because the cyclical variation of the resonant frequency $F_0$ can be associated with the mechanical angle $\Theta$ of the rotor 17, detection of the changing electrical characteristics of the output from the tank circuit can be used to resolve the position of the rotor. In the illustrated embodiments, the changes in amplitude or phase of the output signal is detected and used to control the firing angle of each phase. Delays between the sensing of a mechanical angle (derived from the output characteristics of the tank circuit) and the firing of a phase is adjusted in order to compensate for motor speed and, if necessary, motor torque.

From the illustrated embodiments, it will be appreciated that many different detection schemes can be implemented, depending on how the tank circuit is tuned with respect to the injected signal $F_1$. Two possible schemes have been illustrated herein. The important feature of any detection scheme is the incorporation of the cyclical inductance of a phase winding into the tank circuit so that the cyclical change of inductance can be detected without interfering with the functioning of the power circuit for that phase.

We claim:

1. For a brushless commutated motor having a plurality of poles on a rotor and a plurality of phase windings on a stator, a system for controlling a switching frequency $F_s$ of the power signal applied to each phase winding, the system comprising:

at least one tank circuit comprising capacitive, resistive and inductive elements, wherein one of the phase windings of the motor is the inductive element;

a switch in series connection with the phase winding and in parallel connection with the capacitive and resistive elements of the tank circuit, the switch being responsive to a drive signal for providing the power signal to the phase winding at a switching frequency $F_s$;

means for injecting into an input of the tank circuit a low-energy signal having a frequency $F_1$ that is substantially greater than the switching frequency $F_s$ of the power signal;

a detector responsive to an output of the tank circuit for monitoring the low-energy signal and detecting an event resulting from a change in the value of the inductance of the phase winding caused by a change in the relative position of the stator and rotor and generating a signal indicative thereof; and a motor controller responsive to the signal from the detector for adjusting the timing of the drive signal in order to maintain a predetermined relationship between the signal from the detector and the power signal.

2. The system of claim 1 wherein each of the phase windings of the motor is associated with a tank circuit such that the phase winding is the inductive element of the tank circuit; the detector being responsive to the output of each tank circuit for detecting the event resulting from the change in the value of the inductance of each phase winding caused by the change in the relative position of the stator and rotor and generating the signal indicative thereof.

3. The system of claim 1 wherein less than all of the phase windings of the motor are each associated with a tank circuit, such that the phase winding is the inductive element of the tank circuit and the detector is responsive to the output of each of the tank circuits.

4. The system of claim 1 wherein the event detected by the detector is a minimum difference between the resonant frequency $F_0$ and the frequency $F_1$ of the low-energy signal and the detector includes means for detecting the minimum difference.

5. The system of claim 4 wherein the means for detecting the minimum difference is a phase crossover detector.

6. The system of claim 4 wherein the means for detecting the minimum difference is a peak amplitude detector.

7. The system of claim 1 wherein the event detected by the detector is a predetermined value of a phase of the output of the tank circuit with respect to a reference signal derived from the injected low-energy signal, and the detector includes means for detecting when the phase equals the predetermined value as the value of the phase oscillates between maximum and minimum values in response to rotation of the rotor.

8. The system of claim 7 wherein the maximum and minimum values of the phase are leading and lagging phases, respectively, the predetermined value of the phase is zero and the means of the detector detects when the value of the phase is approximately zero.

9. The system of claim 8 wherein the means of the detector is a zero-crossing detector.

10. A system for controlling a switching frequency $F_s$ of a power signal to each winding of a brushless commutated motor having a plurality of poles on a rotor and a plurality of phase windings on a stator, the system comprising:

at least one tank circuit incorporating one of the phase windings of the motor and having a resonant frequency $F_0$ that varies over a band of frequencies in response to cyclic changes in the effective value of the inductance of the phase winding between maximum and minimum values as the poles of the rotor change position with respect to the one phase winding;

a switch in series connection with the phase winding and responsive to a drive signal for providing the power signal to the one phase winding at the switching frequency $F_s$;

means for injecting into an input of the tank circuit a low-energy signal having a frequency $F_1$ that is substantially greater than the switching frequency $F_s$;

a detector responsive to an output of the tank circuit for detecting when the difference between the resonant frequency $F_0$ and the frequency $F_1$ of the injected low-energy signal is at a minimum and generating a signal indicative thereof; and a motor controller responsive to the signal from the detector for generating the drive signals to maintain a predetermined relationship between the switching frequency $F_s$ and the signal from the detector.

11. The system of claim 10 wherein each of the phase windings of the motor is associated with a tank circuit such that the detector is responsive to the output of each tank circuit.

12. The system of claim 10 wherein less than all of the phase windings of the motor are each associated with a tank circuit, such that the phase winding is the inductive element of the tank circuit and the detector is responsive to the output of each of the tank circuits.

13. The system of claim 10 including a delay circuit for generating a time-delayed relationship between the switching frequency and the signal from the detector.

14. The system of claim 13 wherein the circuit is responsive to the switching frequency $F_s$ so as to maintain a fixed time delay between the switching frequency $F_s$ and the signal from the detector up to a predetermined value of the switching frequency $F_s$ and maintain a constant delay angle for values of the switching frequency $F_s$ above the predetermined value.

15. The system of claim 10 wherein the means for injecting the low energy signal of frequency $F_1$ includes a generator that is capacitively coupled to the series connected phase winding and switch at a node joining the phase winding and the switch.

16. The system of claim 10 wherein the tank circuit includes series connected capacitive (C) and resistive (R) elements and the detector includes a sensor processing circuit coupled to a node joining the series connected capacitive (C) and resistive (R) elements by way of a switch responsive to the motor control circuit such that the switch functions to selectively disable coupling between the output of the tank circuit and the sensor processing circuit when the phase winding is being driven by the power signal.

17. The system of claim 10 wherein the detector includes means for detecting a maximum amplitude of the output of the tank circuit in order to detect when the difference between the resonant frequency $F_0$ of the tank circuit and the frequency $F_1$ of the injected low-energy signal is at a minimum.

18. The system of claim 10 wherein the detector includes means for detecting a minimum phase angle between the injected low-energy signal and the output of the tank circuit in order to detect when the difference between the resonant frequency $F_0$ of the tank circuit and the frequency $F_1$ of the injected low-energy signal is at a minimum.

19. A circuit for sensing the position of the poles of a rotor for a brushless commutated motor relative to the position of the poles of a stator for the motor, wherein the stator has a plurality of phase windings, the circuit comprising in combination:

at least one tank circuit incorporating one of the phase windings and having a resonant frequency $F_0$ that cyclically varies over a band of frequencies in response to cyclical changes in the effective value of the inductance of the one winding between maximum and minimum values caused by the poles of the rotor changing position with respect to the one phase winding;

means for injecting into an input of the tank circuit a low-energy signal having a frequency $F_1$; and a detector responsive to an output of the tank circuit for detecting when the difference between the resonant frequency $F_0$ and the frequency $F_1$ of the injected low-energy signal is at a minimum and generating a signal in response thereto that is indicative of the position of the rotor.

20. The circuit of claim 19 wherein each of the phase windings of the motor is associated with a tank circuit such that the detector is responsive to the output of each tank circuit.

21. The circuit of claim 19 wherein less than all of the phase windings of the motor are each associated with a tank circuit such that the phase winding is the inductive element of the tank circuit and the detector is responsive to the output of each of the tank circuits.

22. The circuit of claim 19 wherein the tank circuit comprises series connected capacitive (C), resistive (R) and inductive (L) elements wherein the inductive element (L) is the phase winding.

23. The circuit of claim 22 wherein the band of frequencies for the resonant frequency $F_0$ includes the frequency $F_1$.

24. The circuit of claim 22 wherein the signal $F_1$ is much greater than a switching frequency $F_s$ of a power signal applied to the phase winding for developing torque at the rotor.

25. The circuit of claim 19 wherein the detector includes means for detecting a maximum amplitude of the output of the tank circuit in order to determine when the difference between the resonant frequency $F_0$ and the frequency $F_1$ is at a minimum value.

26. The circuit of claim 19 wherein the detector includes means for detecting a minimum phase angle of the output of the tank circuit with respect to the low-energy signal in order to determine when the difference between the resonant frequency $F_0$ and the frequency $F_1$ is at a minimum value.

27. The circuit of claim 19 further comprising:
a system for controlling a switching frequency $F_s$ of a power signal to each of the phase windings of the brushless commutated motor;
a switch in series connection with each of the windings responsive to a drive signal for providing the power signal to each of the phase windings at the switching frequency $F_s$; and
a motor controller responsive to the signal from the detector for generating the drive signal to the phase winding incorporated into the tank circuit in order to maintain a predetermined delay between the drive signal and the signal from the detector.

* * * * *